United States Patent
Shigematsu et al.

(10) Patent No.: US 8,846,247 B2
(45) Date of Patent: Sep. 30, 2014

(54) NON-AQUEOUS ELECTROLYTE FOR SECONDARY BATTERY AND NON-AQUEOUS ELECTROLYTE SECONDARY BATTERY EMPLOYING THE SAME

(71) Applicant: Mitsubishi Chemical Corporation, Chiyoda-ku (JP)

(72) Inventors: Yasuyuki Shigematsu, Yokohama (JP); Masamichi Onuki, Yokohama (JP); Kunihisa Shima, Yokkaichi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 13/964,511

(22) Filed: Aug. 12, 2013

(65) Prior Publication Data

US 2013/0330610 A1  Dec. 12, 2013

Related U.S. Application Data

(63) Continuation of application No. PCT/JP2012/052978, filed on Feb. 9, 2012.

(30) Foreign Application Priority Data

Feb. 10, 2011 (JP) ................................. 2011-027671
May 9, 2011 (JP) ................................. 2011-104377
Aug. 1, 2011 (JP) ................................. 2011-168647

(51) Int. Cl.
*H01M 10/0567* (2010.01)
*H01M 10/0568* (2010.01)
*H01M 10/0569* (2010.01)

(52) U.S. Cl.
CPC ...... *H01M 10/0567* (2013.01); *H01M 10/0568* (2013.01); *Y02E 60/12* (2013.01); *H01M 10/0569* (2013.01)
USPC .......................................... 429/200; 429/199

(58) Field of Classification Search
USPC ..................................... 429/231.95, 200, 199
See application file for complete search history.

(56) References Cited

U.S. PATENT DOCUMENTS

| | | | |
|---|---|---|---|
| 4,837,359 A | 6/1989 | Woynar et al. | |
| 5,641,851 A | 6/1997 | Wolff et al. | |
| 6,392,001 B1 | 5/2002 | Mertes et al. | |
| 6,693,212 B1 * | 2/2004 | Wietelmann et al. | 558/73 |
| 2010/0015514 A1 * | 1/2010 | Miyagi et al. | 429/129 |
| 2010/0021814 A1 * | 1/2010 | Yoshiyuki | 429/203 |
| 2011/0200887 A1 | 8/2011 | Tuduki et al. | |
| 2012/0009486 A1 | 1/2012 | Hayakawa et al. | |
| 2012/0055668 A1 * | 3/2012 | Wu et al. | 166/250.01 |
| 2013/0122365 A1 * | 5/2013 | Zaghib et al. | 429/211 |

FOREIGN PATENT DOCUMENTS

| | | |
|---|---|---|
| JP | 57-047319 | 3/1982 |
| JP | 63-057577 | 3/1988 |
| JP | 63-174961 | 7/1988 |
| JP | 7-304724 | 11/1995 |
| JP | 8-225511 | 9/1996 |
| JP | 2002-008719 | 1/2002 |
| JP | 2004-214041 | 7/2004 |
| JP | 2005-158671 | 6/2005 |
| JP | 2005-158703 | 6/2005 |
| JP | 2005-259641 | 9/2005 |
| JP | 2005-294020 | 10/2005 |
| JP | 2006-164759 | 6/2006 |
| JP | 2007-242411 | 9/2007 |
| JP | 2010-225522 | 10/2010 |
| JP | 2011-171108 | 9/2011 |
| JP | 2011-198691 | 10/2011 |
| JP | 2011-216443 | 10/2011 |

OTHER PUBLICATIONS

International Search Report Mar. 27, 2012 in PCT/JP2012/052978 filed Feb. 9, 2012.

* cited by examiner

*Primary Examiner* — Mark F Huff
*Assistant Examiner* — Monique Wills
(74) *Attorney, Agent, or Firm* — Oblon, Spivak, McClelland, Maier & Neustadt, L.L.P.

(57) ABSTRACT

A non-aqueous electrolyte solution for a non-aqueous electrolyte secondary battery that has a positive electrode and a negative electrode capable of the absorbing and releasing of a metal ion, and a separator,
the non-aqueous electrolyte solution comprising, in addition to an electrolyte and a non-aqueous solvent, 0.01 mass % or more to less than 3 mass % of a compound having one or more partial structure represented by the following general formula (1) and two or more isocyanate groups in the molecule:

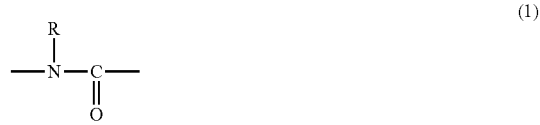

(1)

(In the general formula (1), R represents hydrogen or a $C_1$-$C_{12}$ organic group that may contain an isocyanate group and is constituted of atoms selected from the group consisting of hydrogen atom, carbon atom, nitrogen atom, oxygen atom, sulfur atom, phosphorus atom, and halogen atom).

14 Claims, No Drawings

NON-AQUEOUS ELECTROLYTE FOR SECONDARY BATTERY AND NON-AQUEOUS ELECTROLYTE SECONDARY BATTERY EMPLOYING THE SAME

CROSS-REFERENCE TO RELATED APPLICATIONS

This is a continuation of International Application PCT/JP2012/052978, filed on Feb. 9, 2012, and designated the U.S., (and claims priority from Japanese Patent Application 2011-027671 which was filed on Feb. 10, 2011, Japanese Patent Application 2011-104377 which was filed on May 9, 2011, and Japanese Patent Application 2011-168647 which was filed on Aug. 1, 2011) the entire contents of which are incorporated herein by reference.

TECHNICAL FIELD

The present invention relates to a non-aqueous electrolyte solution for use in secondary batteries and to a secondary battery that uses this non-aqueous electrolyte solution. More particularly, the present invention relates to a non-aqueous electrolyte solution for lithium secondary batteries that contain specific components and to a lithium secondary battery that uses this non-aqueous electrolyte solution.

BACKGROUND ART

The downsizing of electronic devices brought about by the rapid development of modern industry was accompanied by a desire for additional increases in the capacity of secondary batteries. This resulted in the development of lithium secondary batteries, which have higher energy densities than nickel-cadmium batteries and nickel-hydride batteries, and efforts to improve the properties of lithium secondary batteries have also continued up to the present time.

On the other hand, against the backdrop of global concerns such as environmental issues and energy issues, substantial expectations are also coalescing around the application of lithium secondary batteries as large power sources, e.g., vehicle power sources and stationary power sources. However, it is generally essential with such batteries to ensure the stability versus repetitive charge/discharge over long-term periods of time, and in addition their use in environments exposed to the atmosphere is also on the horizon. As a consequence, the battery properties in low-temperature environments, such as below the freezing point, and particularly the low-temperature discharge characteristics are important considerations in the development of these batteries.

The components constituting a lithium secondary battery may be broadly classified into mainly a positive electrode, a negative electrode, a separator, and an electrolyte solution. Among these, the electrolyte solution commonly takes the form of a non-aqueous electrolyte solution prepared by dissolving an electrolyte, e.g., $LiPF_6$, $LiBF_4$, $LiClO_4$, $LiCF_3SO_3$, $LiAsF_6$, $LiN(CF_3SO_2)_2$, $LiCF_3(CF_2)_3SO_3$, and so forth, in a non-aqueous solvent, e.g., a cyclic carbonate such as ethylene carbonate or propylene carbonate; a chain carbonate such as dimethyl carbonate, diethyl carbonate, or ethyl methyl carbonate; a cyclic ester such as γ-butyrolactone or γ-valerolactone; or a chain ester such as methyl acetate or methyl propionate.

In one tactic for improving the extended durability of lithium secondary batteries, a prescribed compound is added to the aforementioned electrolyte solution in order to bring about the formation on the negative electrode of a passivation film during the initial operation of the battery. This results in an inhibition of secondary reactions, such as the reductive degradation reactions of the solvent that are a major cause of deterioration.

One such compound is a compound having the isocyanate group in the molecule. Patent Document 1, Patent Document 2, and Patent Document 3 disclose improvements in the cycle stability achieved through the addition to the electrolyte solution of, respectively, an isocyanate group-containing low molecular weight compound, a chain isocyanate compound, and a diisocyanate compound.

In addition, with the goal of improving the cycle characteristics, Patent Document 4 proposes the addition to the electrolyte solution of a prescribed sulfone compound in combination with an isocyanate compound. However, it is difficult with the aforementioned isocyanate compounds in particular to satisfy the extended durability performance required in large-scale batteries, e.g., for automotive service. In addition, there is demand for additional improvements in order to achieve satisfactory battery characteristics also including the low-temperature discharge characteristics.

On the other hand, lithium secondary batteries in some cases use an immobilized electrolyte solution as provided, for example, by impregnating a non-aqueous electrolyte solution within a higher order structure formed by a polymeric matrix. This makes it possible to increase the design freedom with regard to battery shape and to provide a lithium secondary battery that is almost entirely free of fluid leakage. These so-called gel polymer electrolytes may also use an isocyanate compound. For example, Patent Documents 5, 6, and 7 disclose the formation of polymeric matrices through the curing of a combination with a polymer that can bond with the isocyanate group, e.g., a polyol.

Low molecular weight aliphatic diisocyanates and alicyclic diisocyanates as described above, as well as the polyisocyanates produced using such diisocyanates as their primary starting materials, are often used as crosslinking agents for forming polymeric matrices. Resins cured using a polyisocyanate generally exhibit excellent mechanical properties, for example, flexibility, and an excellent resistance to chemicals, and are widely used in, for example, coatings, adhesives, sealants, waterproofing agents, foams, and elastomers. They are also advantageously used in polymer gel electrolytes for the same reasons.

Polyisocyanates having, for example, a carbodiimide, uretdione, oxadiazinetrione, biuret, urethane, allophanate, or isocyanurate skeleton are known. Disclosures relative to biuret-type polyisocyanates are made in, for example, Patent Document 8 and Patent Document 9; disclosures relative to isocyanurate-type polyisocyanates are made in, for example, Patent Document 10 and Patent Document 11; and a disclosure relative to allophanate-type polyisocyanates is made in, for example, Patent Document 12.

However, when an electrolyte solution is immobilized, the polymeric matrix impairs ion mobility and the battery resistance is then substantially increased, and as a consequence this is unsuitable, for example, for batteries where large currents are required. Accordingly, and depending on the battery duty, it may be undesirable for an isocyanate compound and a compound curable therewith to both be present in the electrolyte solution and for the electrolyte solution to be immobilized by their cure.

Patent Document 1: Japanese Patent Application Laid-open No. 2005-259641

Patent Document 2: Japanese Patent Application Laid-open No. 2006-164759

Patent Document 3: Japanese Patent Application Laid-open No. 2007-242411

Patent Document 4: Japanese Patent Application Laid-open No. 2010-225522

Patent Document 5: Japanese Patent Application Laid-open No. 2005-158703

Patent Document 6: Japanese Patent Application Laid-open No. 2005-294020

Patent Document 7: Japanese Patent Application Laid-open No. 2004-214041

Patent Document 8: Japanese Patent Application Laid-open No. S63-174961

Patent Document 9: Japanese Patent Application Laid-open No. H8-225511

Patent Document 10: Japanese Patent Application Laid-open No. S63-57577

Patent Document 11: Japanese Patent Application Laid-open No. S57-47319

Patent Document 12: Japanese Patent Application Laid-open No. H7-304724

DISCLOSURE OF THE INVENTION

The present invention was pursued considering the background art described above and provides a non-aqueous electrolyte solution for a secondary battery that exhibits an excellent extended durability and excellent load characteristics.

As a result of intensive investigations in view of the problems cited above, the present inventor discovered that the extended durability and load characteristics are substantially improved by the use in a non-aqueous electrolyte secondary battery of a non-aqueous electrolyte solution comprising an electrolyte, a non-aqueous solvent, and a prescribed quantity of a compound that has within its molecule at least one specific partial structure and at least two isocyanate groups. The present invention was achieved based on this discovery.

<1> A non-aqueous electrolyte solution for a non-aqueous electrolyte secondary battery that has a positive electrode and a negative electrode capable of the absorbing and releasing of a metal ion, and a separator, the non-aqueous electrolyte solution comprising, in addition to an electrolyte and a non-aqueous solvent, 0.01 mass % or more to less than 3 mass % of a compound having one or more partial structure represented by the following general formula (1) and two or more isocyanate groups in the molecule:

[Chem. 1]

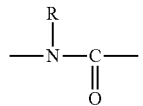
(1)

(In the general formula (1), R represents hydrogen or a $C_1$-$C_{12}$ organic group that may contain an isocyanate group and is constituted of atoms selected from the group consisting of hydrogen atom, carbon atom, nitrogen atom, oxygen atom, sulfur atom, phosphorus atom, and halogen atom).

<2> The non-aqueous electrolyte solution according to <1>, wherein the compound is a compound having at least one skeleton selected from uretdione, oxadiazinetrione, biuret, urethane, allophanate, and isocyanurate.

<3> The non-aqueous electrolyte solution according to <1> or <2>, wherein the compound is a compound having a number-average molecular weight of 300 or more to 5000 or less.

<4> The non-aqueous electrolyte solution according to any one of <1> to <3>, comprising lithium hexafluorophosphate ($LiPF_6$) at 0.5 to 3 mol/L in the overall non-aqueous electrolyte solution.

<5> The non-aqueous electrolyte solution according to any one of <1> to <4>, comprising at least one selection from the group consisting of monofluorophosphate salts, difluorophosphate salts, tetrafluoroborate salts, and compounds represented by the following general formulas (2) to (5):

[Chem. 2]

$$LiN(C_lF_{2l+1}SO_2)(C_mF_{2m+1}SO_2) \qquad (2)$$

(In the general formula (2), l and m independently represent integers from 0 to 4.)

[Chem. 3]

$$LiC_nF_{2n+1}SO_3 \qquad (3)$$

(In the general formula (3), n represents an integer from 0 to 4.)

[Chem. 4]

$$M_a^1[M^2(C_2O_4)_bR_c]_d \qquad (4)$$

(In the general formula (4), $M^1$ represents an element selected from Groups 1 and 2 of the Periodic Table, and aluminum (Al); $M^2$ represents an element selected from the transition metals and Groups 13, 14, and 15 of the Periodic Table; R represents a group selected from halogens, $C_1$-$C_{11}$ alkyl groups, and $C_1$-$C_{11}$ halogen-substituted alkyl groups; a and b represent positive integers; c represents 0 or a positive integer; and d represents an integer from 1 to 3).

[Chem. 5]

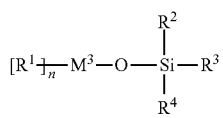
(5)

(In the general formula (5), $M^3$ represents a metal atom, a phosphorus atom, a boron atom, or P=O. $R^1$ represents a $C_1$-$C_{11}$ alkyloxy group, a silyloxy group, or a $C_1$-$C_{11}$ alkylsilyloxy group. n represents the number of $R^1$ groups bonded to the $M^3$. When n is two or more, the $R^1$ groups may be the same as each other or may differ from one another. $R^2$ to $R^4$ each independently represent a $C_1$-$C_{11}$ alkyl group, a $C_1$-$C_{11}$ alkenyl group, a $C_1$-$C_{11}$ alkyloxy group, or a $C_6$-$C_{11}$ aryl group.).

<6> The non-aqueous electrolyte solution according to <5>, comprising a compound represented by the general formula (4) in which the $M^1$ is lithium and the $M^2$ is phosphorus or boron.

<7> The non-aqueous electrolyte solution according to <5> or <6>, comprising a compound represented by the general formula (5) in which the $M^3$ is the boron atom or P=O.

<8> The non-aqueous electrolyte solution according to any one of <5> to <7>, comprising 0.01 to 5 mass %, in the overall non-aqueous electrolyte solution, of at least one selection from the group consisting of monofluorophosphate salts, difluorophosphate salts, tetrafluoroborate salts, and compounds represented by the general formulas (2) to (5).

<9> The non-aqueous electrolyte solution according to any one of <5> to <8>, comprising at least one selection from the group consisting of lithium monofluorophosphate, lithium difluorophosphate, lithium tetrafluoroborate, lithium bis(fluorosulfonyl)imide, lithium bis(trifluoromethanesulfonyl)imide, lithium fluorosulfonate, lithium trifluoromethanesulfonate, lithium bis(oxalato)borate, lithium difluoro(oxalato)borate, lithium tris(oxalato)phosphate, lithium difluorobis(oxalato)phosphate, lithium tetrafluoro(oxalato)phosphate, tris(trimethylsilyl)borate, and tris(trimethylsilyl)phosphate.

<10> The non-aqueous electrolyte solution according to any one of <1> to <9>, comprising at least one selection from the group consisting of unsaturated cyclic carbonates, fluorinated cyclic carbonates, and dinitrile compounds represented by general formula (6):

[Chem. 6]

(6)

(In the general formula (6), A is a $C_1$-$C_{10}$ organic group that is constituted of atoms selected from the group consisting of hydrogen atom, carbon atom, nitrogen atom, oxygen atom, sulfur atom, phosphorus atom, and halogen atom).

11> The non-aqueous electrolyte solution according to any one of <1> to <10>, for a non-aqueous electrolyte secondary battery that has a separator comprising at least one selection from polyethylene and polypropylene.

<12> The non-aqueous electrolyte solution according to any one of <1> to <11>, for a non-aqueous electrolyte secondary battery that contains carbon as a negative electrode active material.

<13> A non-aqueous electrolyte secondary battery comprising: a positive electrode and a negative electrode capable of the absorbing and releasing of a metal ion; a separator; and the non-aqueous electrolyte solution according to any one of <1> to <12>.

<14> The non-aqueous electrolyte secondary battery according to <13>, containing carbon as a negative electrode active material, wherein the non-aqueous electrolyte secondary battery comprises a negative electrode active material that contains at least one carbonaceous material for which the Raman R value, which is defined as the ratio, in argon ion laser Raman spectroscopy, of the peak intensity at 1360 cm$^{-1}$ to the peak intensity at 1580 cm$^{-1}$, is 0.1 or more.

One cause of the appearance of the excellent effects of the present invention is the incorporation of the compound having two or more isocyanate groups. The incorporation of such a compound in the electrolyte solution results in the formation on the negative electrode surface of a passivation film that originates with the previously described partial structure and also results in tight bonding by this film on the negative electrode surface. As a consequence, reductive degradation of the solvent can be effectively inhibited and this effect can be sustained on a long-term basis. In addition, through the presence in the molecule of the partial structure with formula (1), the film is made into a film with a relatively high lithium ion conductivity, and because of this the charge transfer resistance is low and excellent low-temperature discharge characteristics can be obtained. As indicated above, the incorporation in the electrolyte solution of the isocyanate compound according to the present invention so as to avoid immobilization of the electrolyte solution makes it possible to achieve a better durability and better load characteristics than for the use of the other, previously disclosed isocyanate compounds.

The present invention brings about the formation of a low-resistance passivation film on the electrode surface and an improved chemical stability for the substances in the battery and can therefore provide a non-aqueous electrolyte solution for a secondary battery that exhibits both excellent low-temperature discharge characteristics and excellent cycle characteristics on an long-term basis and can also provide a secondary battery.

BEST MODE FOR CARRYING OUT THE INVENTION

Embodiments of the present invention are described in detail below, but the details of the constituent features described below are only one example (representative example) of an embodiment of the present invention and there is no limitation to their content. Various modifications can be carried out within the scope of the essential features.

[1. Non-Aqueous Electrolyte Solution]
<1-1. Electrolyte>

There are no particular limitations on the electrolyte used in the non-aqueous electrolyte solution of the present invention, and the electrolytes known for use as electrolytes in non-aqueous electrolyte secondary batteries can be freely used and incorporated. The electrolyte is preferably a lithium salt when the non-aqueous electrolyte solution of the present invention is used in a non-aqueous electrolyte secondary battery.

The electrolyte can be specifically exemplified by inorganic lithium salts such as $LiClO_4$, $LiAsF_6$, $LiPF_6$, $Li_2CO_3$, and $LiBF_4$;

fluorine-containing organolithium salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_3(CF_3)$, $LiBF_3(C_2F_5)$ $LiBF_2(CF_3)_2$, $LiBF_2(C_2F_5)_2$, $LiBF_2(CF_3SO_2)_2$, and $LiBF_2(C_2F_5SO_2)_2$;

the lithium salts of complexes containing a dicarboxylic acid such as lithium bis(oxalato)borate, lithium difluoro(oxalato)borate, lithium tris(oxalato)phosphate, lithium difluorobis(oxalato)phosphate, and lithium tetrafluoro(oxalato)phosphate; and sodium salts and potassium salts such as $KPF_6$, $NaPF_6$, $NaBF_4$, and $CF_3SO_3Na$.

Preferred among the preceding are $LiPF_6$, $LiBF_4$, $LiCF_3SO_3$, $LiN(CF_3SO_2)_2$, $LiN(C_2F_5SO_2)_2$, and lithium bis(oxalato) borate, while $LiPF_6$ and $LiBF_4$ are more preferred.

The electrolyte may be used singly as one type, or as two or more types in any combinations and ratios. Among the preceding, the co-use of two of the indicated inorganic lithium salts or the co-use of an inorganic lithium salt and a fluorine-containing organolithium salt is preferred because this results in an inhibition of gas generation during continuous charging or a suppression of the deterioration after high-temperature storage.

The concentration of the lithium salt in the final composition of the non-aqueous electrolyte solution of the present invention may be freely selected insofar as the effects of the present invention are not significantly impaired, and is in the range from generally 0.5 mol/L or more, preferably 0.6 mol/L or more, and more preferably 0.8 mol/L or more to generally 3 mol/L or less, preferably 2 mol/L or less, and more preferably 1.5 mol/L or less. When this range is obeyed, the lithium charged particle is not too scarce, the viscosity of the electrolyte solution is in a suitable range, and the electrical conductivity of the electrolyte solution can be satisfactorily secured.

<1-2. Non-Aqueous Solvent>

The non-aqueous solvent used in the non-aqueous electrolyte solution of the present invention should be a solvent that does not exercise a negative effect on the battery characteristics during battery service, but is not otherwise particularly limited. However, it is preferably at least one selection from the following solvents that are used in non-aqueous electrolyte solutions. Commonly used non-aqueous solvents can be exemplified by chain and cyclic carbonates, chain and cyclic carboxylic acid esters, chain and cyclic ethers, phosphorus-containing organic solvents, and sulfur-containing organic solvents.

There are no particular limitations on the type of chain carbonate, and the dialkyl carbonates are an example of the commonly used chain carbonates. Each of the alkyl groups in the dialkyl carbonate preferably has from 1 to 5 carbons and particularly preferably from 1 to 4 carbons. Specific examples are dimethyl carbonate, ethyl methyl carbonate, diethyl carbonate, methyl n-propyl carbonate, ethyl n-propyl carbonate, and di-n-propyl carbonate. Among these, dimethyl carbonate, ethyl methyl carbonate, and diethyl carbonate are preferred for their ease of industrial acquisition and because they have various excellent properties for non-aqueous electrolyte secondary batteries.

There are no particular limitations on the type of cyclic carbonate, and, among the commonly used cyclic carbonates, cyclic carbonates having from 2 to 6 carbons in the alkylene group are preferred and cyclic carbonates having from 2 to 4 carbons in the alkylene group are particularly preferred. Specific examples here are ethylene carbonate, propylene carbonate, butylene carbonate, (2-ethylethylene carbonate, and cis- and trans-2,3-dimethylethylene carbonate). Among these, ethylene carbonate and propylene carbonate are preferred because they have various excellent properties for non-aqueous electrolyte secondary batteries.

There are no particular limitations on the type of chain carboxylic acid ester, and examples of the commonly used chain carboxylic acid esters are methyl acetate, ethyl acetate, n-propyl acetate, i-propyl acetate, n-butyl acetate, i-butyl acetate, t-butyl acetate, methyl propionate, ethyl propionate, n-propyl propionate, i-propyl propionate, n-butyl propionate, i-butyl propionate, and t-butyl propionate. Among these, methyl acetate, ethyl acetate, methyl propionate, and ethyl propionate are preferred for their ease of industrial acquisition and because they have various excellent properties for non-aqueous electrolyte secondary batteries.

There are no particular limitations on the type of cyclic carboxylic acid ester, and examples of commonly used cyclic carboxylic acid esters are γ-butyrolactone, γ-valerolactone, and δ-valerolactone. Among these, γ-butyrolactone is preferred for its ease of industrial acquisition and because it has various excellent properties for non-aqueous electrolyte secondary batteries.

There are no particular limitations on the type of chain ether, and examples of commonly used chain ethers are dimethoxymethane, dimethoxyethane, diethoxymethane, diethoxyethane, ethoxymethoxymethane, and ethoxymethoxyethane. Among these, dimethoxyethane and diethoxyethane are preferred for their ease of industrial acquisition and because they have various excellent properties for non-aqueous electrolyte secondary batteries.

There are no particular limitations on the type of cyclic ether, and examples of commonly used cyclic ethers are tetrahydrofuran, 2-methyltetrahydrofuran, and tetrahydropyran.

There are no particular limitations on the type of phosphorus-containing organic solvent, and examples of commonly used phosphorus-containing organic solvents are phosphate esters such as trimethyl phosphate, triethyl phosphate, and triphenyl phosphate; phosphite esters such as trimethyl phosphite, triethyl phosphite, and triphenyl phosphite; and phosphine oxides such as trimethylphosphine oxide, triethylphosphine oxide, and triphenylphosphine oxide.

There are no particular limitations on the type of sulfur-containing organic solvent, and examples of commonly used sulfur-containing organic solvents are ethylene sulfite, 1,3-propane sultone, 1,4-butane sultone, methyl methanesulfonate, busulfan, sulfolane, sulfolene, dimethyl sulfone, diphenyl sulfone, methyl phenyl sulfone, dibutyl disulfide, dicyclohexyl disulfide, tetramethylthiuram monosulfide, N,N-dimethylmethanesulfonamide, and N,N-diethylmethanesulfonamide.

Among the preceding, chain carbonates, cyclic carbonates, chain carboxylic acid esters, and cyclic carboxylic acid esters are preferred because they have various excellent properties for non-aqueous electrolyte secondary batteries, while ethylene carbonate, propylene carbonate, dimethyl carbonate, ethyl methyl carbonate, diethyl carbonate, ethyl acetate, methyl propionate, ethyl propionate, and γ-butyrolactone are more preferred and ethylene carbonate, propylene carbonate, dimethyl carbonate, ethyl methyl carbonate, diethyl carbonate, ethyl acetate, methyl propionate, and γ-butyrolactone are particularly preferred.

A single non-aqueous solvent may be used or two or more may be used in combination, and the use of two or more in combination is preferred. For example, a solvent with a high dielectric constant, such as a cyclic carbonate, is preferably used in combination with a low viscosity solvent, such as a chain carbonate or a chain ester. A preferred combination of non-aqueous solvents is a combination in which the main components are a cyclic carbonate and a chain carbonate. For such a combination, the total of the cyclic carbonate and chain carbonate in the overall non-aqueous solvent is generally 80 volume % or more and is preferably 85 volume % or more and more preferably 90 volume % or more, while the volume of the cyclic carbonate in the total of the cyclic carbonate and chain carbonate is generally 5 volume % or more and is preferably 10 volume % or more and more preferably 15 volume % or more, and is generally 50 volume % or less and is preferably 40 volume % or less and more preferably 35 volume % or less. The use of such non-aqueous solvent combinations is preferred because they provide a good balance between the cycle characteristics and high-temperature storability (particularly the high-load discharge capacity and residual capacity after high-temperature storage) of the fabricated battery.

Specific examples of preferred cyclic carbonate+chain carbonate combinations are ethylene carbonate+chain carbonate combinations such as ethylene carbonate+dimethyl carbonate, ethylene carbonate+diethyl carbonate, ethylene carbonate+ethyl methyl carbonate, ethylene carbonate+dimethyl carbonate+diethyl carbonate, ethylene carbonate+dimethyl carbonate+ethyl methyl carbonate, ethylene carbonate+diethyl carbonate+ethyl methyl carbonate, and ethylene carbonate+dimethyl carbonate+diethyl carbonate+ethyl methyl carbonate.

Also preferred are combinations provided by the addition of propylene carbonate to an ethylene carbonate+chain carbonate combination. When propylene carbonate is incorporated, the volume ratio between the ethylene carbonate and propylene carbonate is preferably 99:1 to 40:60 and particularly preferably 95:5 to 50:50. In addition, in a preferred embodiment, the amount of propylene carbonate in the overall non-aqueous solvent is generally 0.1 volume % or more and is preferably 1 volume % or more and more preferably 2 volume % or more, and is generally 10 volume % or less and is preferably 8 volume % or less and more preferably 5 volume % or less: this is preferred because the properties of the ethylene carbonate+chain carbonate combination can be maintained while the discharge characteristics on load are also excellent.

Among the preceding, combinations that contain an asymmetric chain carbonate are even more preferred, and combinations that contain a symmetric chain carbonate and an asymmetric chain carbonate, e.g., ethylene carbonate+dimethyl carbonate+ethyl methyl carbonate, ethylene carbonate+diethyl carbonate+ethyl methyl carbonate, and ethylene carbonate+dimethyl carbonate+diethyl carbonate+ethyl methyl carbonate, or combinations that additionally contain propylene carbonate, are particularly preferred because they provide a good balance between the cycle characteristics and the discharge characteristics on load. Among these, combinations in which the asymmetric chain carbonate is ethyl methyl carbonate are preferred and the number of carbons in the alkyl groups making up the dialkyl carbonates is preferably 1 or 2.

Other examples of preferred combinations for the non-aqueous solvent are combinations that contain a chain ester. In particular, the incorporation of a chain ester in the previously described cyclic carbonate+chain carbonate combination is preferred from the standpoint of improving the discharge characteristics of the battery on load, and ethyl acetate and methyl propionate are particularly preferred for the chain ester. The volume of the chain ester in the overall non-aqueous solvent is generally 5 volume % or more and is preferably 8 volume % or more and more preferably 15 volume % or more, and is generally 50 volume % or less and is preferably 35 volume % or less, more preferably 30 volume % or less, and even more preferably 25 volume % or less.

Another example of a preferred combination for the non-aqueous solvent is a combination in which 60 volume % or more of the overall non-aqueous solvent is a combination comprising one organic solvent selected from the group consisting of ethylene carbonate, propylene carbonate, and butylene carbonate and γ-butyrolactone and γ-valerolactone or comprising two or more organic solvents selected from this same group. The flash point of such a combination is preferably brought to 50° C. or more and particularly preferably 70° C. or more. A non-aqueous electrolyte solution that uses this non-aqueous solvent will exhibit little fluid leakage and little evaporation of the non-aqueous solvent even during use at high temperatures. Among the preceding, a good balance between the cycle characteristics and the discharge characteristics on load generally occurs when a non-aqueous solvent is used in which the total of the ethylene carbonate and γ-butyrolactone in the overall non-aqueous solvent is generally 80 volume % or more and preferably 90 volume % or more, and the volumetric ratio between the ethylene carbonate and γ-butyrolactone is 5:95 to 45:55 or when a non-aqueous solvent is used in which the total of the ethylene carbonate and propylene carbonate is generally 80 volume % or more and preferably 90 volume % or more, and the volumetric ratio between the ethylene carbonate and the propylene carbonate is 30:70 to 80:20.

<1-3. Compound Having One or More Partial Structure Represented by General Formula (1) and Two or More Isocyanate Groups in the Molecule>

The non-aqueous electrolyte solution of the present invention characteristically contains 0.01 mass % or more to less than 3 mass % of a compound having at least one or more partial structure represented by the following general formula (1) and two or more isocyanate groups in the molecule (this compound is also abbreviated as the "isocyanate compound according to the present invention" in the following).

[Chem. 7]

In the general formula (1), R represents hydrogen or a $C_1$-$C_{12}$ organic group that may contain an isocyanate group and is constituted of atoms selected from the group consisting of hydrogen atom, carbon atom, nitrogen atom, oxygen atom, sulfur atom, phosphorus atom, and halogen atom. The $C_1$-$C_{12}$ organic group that is constituted of atoms selected from the group consisting of hydrogen atom, carbon atom, nitrogen atom, oxygen atom, sulfur atom, phosphorus atom, and halogen atom denotes, in addition to organic groups comprising carbon atom and hydrogen atom, also organic groups that may comprise nitrogen atom, oxygen atom, sulfur atom, phosphorus atom or halogen atom. The organic groups that may comprise nitrogen atom, oxygen atom, sulfur atom, phosphorus atom or halogen atom include organic groups in which some of the carbon atoms in the skeleton are substituted with any of the foregoing atoms, or organic groups having a substituent that is made up of the foregoing atoms.

The $C_1$-$C_{12}$ organic group that may contain an isocyanate group and is constituted of atoms selected from the group consisting of hydrogen atom, carbon atom, nitrogen atom, oxygen atom, sulfur atom, phosphorus atom, and halogen atom is preferably a $C_{1-4}$ alkyl group, a $C_{1-12}$ alkylene group, a $C_{4-12}$ cycloalkylene group, a $C_{6-12}$ aromatic hydrocarbon, or a $C_{1-12}$ organic group that contains at least one of any of the elements F, N, S, and O, in each instance possibly containing an isocyanate group.

Viewed from the standpoint of the stability as an organic material, of the two ends of the structure with general formula (1), preferably one is bonded to a carbon atom and the other is preferably bonded to a nitrogen atom or an oxygen atom. Viewed from the standpoint of ease of production, the isocyanate compound according to the present invention more preferably has at least one skeleton selected from uretdione, oxadiazinetrione, biuret, urethane, allophanate, and isocyanurate.

The isocyanate compound according to the present invention has two or more isocyanate groups in the molecule, but the number of isocyanate groups is preferably 3 or more and generally 15 or less and is preferably 10 or less and more preferably 8 or less. When this range is obeyed, the stability of the film can be raised and an increase in the charge transfer resistance of the positive electrode due to an increase in functional groups can be prevented.

The molecular weight of the isocyanate compound according to the present invention is not particularly limited; however, in order to manifest a greater effect than prior low molecular weight isocyanates having simple molecular structures, the number-average molecular weight is generally 200 or more and preferably 300 or more, and generally is 10,000 or less and is preferably 5,000 or less, more preferably 3,000 or less, and even more preferably 2,000 or less. Having the number-average molecular weight be in the indicated range creates the circumstances that enable the solubility in the electrolyte solution to be secured. For the same reason, the average number of functional groups is 2 or more and preferably 3 or more, and generally 12 or less and is preferably 10 or less and more preferably 8 or less.

Considered in terms of the cost of the starting materials, the ease of production, and the durability of the adhered film, an isocyanate group in terminal position on the isocyanate compound according to the present invention is preferably bonded to an alkylene group. There are no particular limitations on the number of carbons in the alkylene group to which the terminal isocyanate group is bonded, but the number of carbons here is preferably 4 or more and is preferably 12 or less and more preferably 8 or less.

As long as the isocyanate compound according to the present invention has one or more partial structure of general formula (1) and two or more isocyanate groups, other structures than this structure and a method of producing the same are not particularly limited. The isocyanate according to the present invention can be exemplified by the polyisocyanates provided by at least the dimerization of the diisocyanate compounds given below.

These starting diisocyanate compounds can be exemplified by compounds such as diisocyanatomethane, 1,3-diisocyanatopropane, 1,4-diisocyanatobutane, 1,5-diisocyanatopentane, 1,6-diisocyanatohexane, 1,7-diisocyanatoheptane, 1,8-diisocyanatooctane, 1,12-diisocyanatododecane, 1,3-diisocyanato-2-fluoropropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, 1,3-bis(isocyanatomethyl)cyclohexane, dicyclohexylmethane diisocyanate, carbonyl diisocyanate, 1,4-diisocyanatobutane-1,4-dione, 1,5-diisocyanatopentane-1,5-dione, diisocyanatobenzene, toluene diisocyanate, xylylene diisocyanate, ethyldiisocyanatobenzene, trimethyldiisocyanatobenzene, diisocyanatonaphthalene, diisocyanatobiphenyl, diphenylmethane diisocyanate, and 2,2-bis(isocyanatophenyl)hexafluoropropane. Among the preceding, diisocyanate compounds having a $C_{4-12}$ alkylene structure are preferred and diisocyanate compounds having a $C_{4-8}$ alkylene structure are more preferred.

The isocyanate compound according to the present invention can be specifically exemplified by compounds with general formulas (1-1) to (1-4) given below. The following compounds with general formulas (1-1) to (1-4) correspond to compounds provided by at least the dimerization of the diisocyanate compounds described above: the compounds with general formulas (1-1) and (1-2) are aliphatic polyisocyanates provided by the trimerization of a diisocyanate compound, and the compounds with general formulas (1-3) and (1-4) are aliphatic polyisocyanates provided by the addition of a polyhydric alcohol to a diisocyanate compound. Compounds with general formulas (1-1) to (1-4) are commercially available, for example, as DURANATE™ TPA-100, DURANATE™ D101, and DURANATE™ 24A-100 from Asahi Kasei Chemicals Corporation. The R in general formulas (1-1) to (1-4) originates with the starting diisocyanate compound and is preferably a $C_{4-12}$ alkylene group; R' originates with the polyhydric alcohol and is preferably a $C_{2-12}$ alkylene group or a group represented by $C_nH_{2n+1}C(CH_2)_3$ where n is at least 1 and not more than 7.

[Chem. 8]

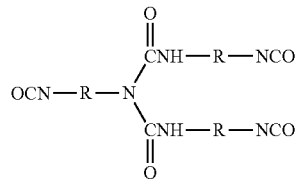

(1-1)

[Chem. 9]

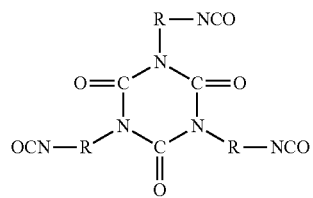

(1-2)

[Chem. 10]

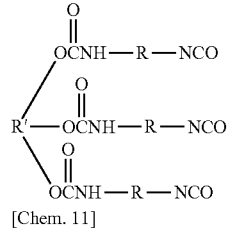

(1-3)

[Chem. 11]

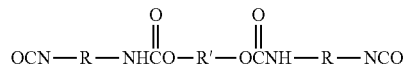

(1-4)

The isocyanate compound according to the present inventions also encompasses so-called blocked isocyanates that have been blocked with a blocking agent in order to raise the storage stability. The blocking agent can be exemplified by alcohols, phenols, organic amines, oximes, and lactams and can be specifically exemplified by n-butanol, phenol, tributylamine, diethylethanolamine, methyl ethyl ketoxime, and ∈-caprolactam.

The co-use of a metal catalyst, e.g., dibutyltin dilaurate, or an amine catalyst, e.g., 1,8-diazabicyclo[5.4.0]undec-7-ene, is also preferred with the goal of obtaining a greater effect by promoting the reactions based on the isocyanate compound according to the present invention.

The isocyanate compound according to the present invention may be used singly as one type, or as two or more concurrent types in any combinations and ratios. In addition, the isocyanate compound according to the present invention may contain, inter alia, an aliphatic diisocyanate that is an unreacted starting material. Such a monomer component may contain material undesirable from the standpoint of worker health and safety, and before use removal is preferably carried out as appropriate into a range in which there is no negative effect on the human body. The isocyanate compound according to the present invention may also contain a monoisocyanate compound. The addition of an alkyl monoisocyanate in particular has the effect of improving the low-temperature discharge characteristics.

The non-aqueous electrolyte solution of the present invention characteristically contains 0.01 mass % or more to less than 3 mass % of the isocyanate compound according to the present invention. The content of the isocyanate compound according to the present invention (the total content when two or more are used) is preferably 0.05 mass % or more and more preferably 0.1 mass % or more, and is preferably 2.5 mass % or less, more preferably 1.5 mass % or less, and even more preferably 0.8 mass % or less. When this range is obeyed, the chemical and physical stability of the battery interior can be satisfactorily increased and an excessive increase in resistance due to film formation can be suppressed.

Within a range in which the effects of the present invention are not impaired, the non-aqueous electrolyte solution of the present invention may contain an isocyanate group-containing compound (also abbreviated as an "additional isocyanate compound" in the following) that is not encompassed by the isocyanate compound according to the present invention. Examples of this additional isocyanate compound are provided below.

Diisocyanate sulfone, diisocyanate ether, trifluoromethane isocyanate, pentafluoroethane isocyanate, trifluoromethanesulfonyl isocyanate, pentafluoroethanesulfonyl isocyanate, benzenesulfonyl isocyanate, p-toluenesulfonyl isocyanate, 4-fluorobenzenesulfonyl isocyanate, 1,3-diisocyanatopropane, 1,3-diisocyanato-2-fluoropropane, 1,4-diisocyanatobutane, 1,4-diisocyanato-2-butene, 1,4-diisocyanato-2-fluorobutane, 1,4-diisocyanato-2,3-difluorobutane, 1,5-diisocyantopentane, 1,5-diisocyanato-2-pentene, 1,5-diisocyanato-2-methylpentane, 1,6-diisocyanatohexane, 1,6-diisocyanato-2-hexene, 1,6-diisocyanato-3-hexene, 1,6-diisocyanato-3-fluorohexane, 1,6-diisocyanato-3,4-difluorohexane, 1,7-diisocyanatoheptane, 1,8-diisocyanatooctane, 1,12-diisocyanatododecane, 1-isocyanatoethylene, isocyanatomethane, 1-isocyanatoethane, 1-isocyanato-2-methoxyethane, 3-isocyanato-1-propene, isocyanatocyclopropane, 2-isocyanatopropane, 1-isocyanatopropane, 1-isocyanato-3-methoxypropane, 1-isocyanato-3-ethoxypropane, 2-isocyanato-2-methylpropane, 1-isocyanatobutane, 2-isocyanatobutane, 1-isocyanato-4-methoxybutane, 1-isocyanato-4-ethoxybutane, methyl isocyanatoformate, isocyanatocyclopentane, 1-isocyanatopentane, 1-isocyanato-5-methoxypentane, 1-isocyanato-5-ethoxypentane, 2-(isocyanatomethyl)furan, isocyanatocyclohexane, 1-isocyanatohexane, 1-isocyanato-6-methoxyhexane, 1-isocyanato-6-ethoxyhexane, ethyl isocyanatoacetate, isocyanatocyclopentane, isocyanatomethyl (cyclohexane), 1-isocyanatoheptane, ethyl 3-isocyanatopropanoate, isocyanatocyclooctane, 2-isocyanatoethyl 2-methylacrylate, 1-isocyanatooctane, 2-isocyanato-2,4,4-trimethylpentane, butyl isocyanatoacetate, ethyl 4-isocyanatobutanoate, 1-isocyanatononane, 1-isocyanatoadamantane, 1-isocyanatodecane, ethyl 6-isocyanatohexanoate, 1,3-bis(isocyanatomethyl)cyclohexane, dicyclohexylmethane diisocyanate, 1-isocyanatoundecane, diisocyanatobenzene, toluene diisocyanate, xylylene diisocyanate, ethyldiisocyanatobenzene, trimethyldiisocyanatobenzene, diisocyanatonaphthalene, diisocyanatobiphenyl, diphenylmethane diisocyanate, 2,2-bis(isocyanatophenyl)hexafluoropropane, allyl isocyanate, and vinyl isocyanate.

Among the preceding, aliphatic diisocyanate compounds, e.g., 1,4-diisocyanatobutane, 1,5-diisocyanatopentane, 1,6-diisocyanatohexane, 1,7-diisocyanatoheptane, and 1,8-diisocyanatooctane, are preferred because they can effectively raise the ability to resist the expansion shrinkage physical deformation that the electrode experiences accompanying charge/discharge.

When an additional isocyanate compound is present, the total content of the additional isocyanate compound and the isocyanate compound according to the present invention in the non-aqueous electrolyte solution is in the range from 0.01 mass % or more and preferably 0.05 mass % or more and more preferably 0.1 mass % or more to less than 3 mass % and preferably 2.5 mass % or less, more preferably 1.5 mass % or less, and even more preferably 0.8 mass % or less.

<1-4. Auxiliary Agent>

In addition to the previously described electrolyte, non-aqueous solvent, and isocyanate compound according to the present invention, the non-aqueous electrolyte solution of the present invention may also contain an auxiliary agent. Examples of the auxiliary agents include, for instance, a cyclic carbonate having an unsaturated bond, a cyclic carbonate having a fluorine atom, an unsaturated cyclic carbonate having a fluorine atom, a dinitrile compound represented by general formula (6), an overcharge preventing agent and other auxiliary agents, as described below.

(Unsaturated Bond-Containing Cyclic Carbonate)

The unsaturated bond-containing cyclic carbonate (also abbreviated as the "unsaturated cyclic carbonate" in the following) also forms a film on the negative electrode surface and thus also has the effect of improving battery life.

The unsaturated cyclic carbonate that can be used is not particularly limited and any unsaturated cyclic carbonate can be used, so long it has a carbon-carbon double bond and/or a carbon-carbon triple bond. Cyclic carbonates having an aromatic ring are included herein among unsaturated cyclic carbonates.

Examples of unsaturated cyclic carbonates include, for instance, vinylene carbonates; ethylene carbonate substituted with an aromatic ring or a substituent having a carbon-carbon double bond or a carbon-carbon triple bond; phenyl carbonates; vinyl carbonates; allyl carbonates; catechol carbonates; ethynyl carbonates; propargyl carbonates or the like.

Examples of vinylene carbonates include, for instance, vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate and the like.

Specific examples of ethylene carbonate substituted with an aromatic ring or a substituent having a carbon-carbon double bond or a carbon-carbon triple bond include, for instance, vinylethylene carbonate, 4,5-divinylethylene carbonate, 4-methyl-5-vinylethylene carbonate, 4-allyl-5-vinylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, 4-methyl-5-allylethylene carbonate, ethynylethylene carbonate, propargylethylene carbonate or the like.

Examples of particularly preferred unsaturated cyclic carbonates that can be used concomitantly with the isocyanate compound according to the present invention include, for instance, vinylene carbonate, methylvinylene carbonate, 4,5-dimethylvinylene carbonate, vinylvinylene carbonate, 4,5-vinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate or ethynylethylene carbonate. Using the foregoing is more appropriate, since they form a stable interface protective coating.

The molecular weight of the unsaturated cyclic carbonate is not particularly limited and may be freely selected insofar as the effects of the present invention are not substantially impaired; however, it is generally 50 or more and preferably 80 or more and generally 250 or less and preferably 150 or less. Within those ranges, the solubility of the unsaturated cyclic carbonate towards the non-aqueous electrolyte solution can be readily secured, and the effect of the present invention is readily brought out. The method for producing the unsaturated cyclic carbonate is not particularly limited, and the unsaturated cyclic carbonate may be produced in accordance with an arbitrarily selected known method.

The unsaturated cyclic carbonate may be used singly as one type, or as two or more concurrent types in any combinations and ratios. In addition, the content of the unsaturated cyclic carbonate (or the total content when two or more are used) in the non-aqueous electrolyte solution is not particularly limited and may be freely selected insofar as the effects of the present invention are not substantially impaired; however, it is generally 0.01 mass % or more and is preferably 0.1 mass % or more and more preferably or more 0.2 mass % and is generally 5 mass % or less and is preferably 4 mass % or less and more preferably 3 mass % or less. When this range is obeyed, the cycle characteristics of the non-aqueous electrolyte secondary battery can be improved and the reduction in the discharge capacity retention rate associated with a decline in the high-temperature storage characteristics can be inhibited, while the increase in the resistance caused by excessive film formation can be suppressed.

(Fluorine Atom-Containing Cyclic Carbonate)

The number of fluorine atoms in the fluorine atom-containing cyclic carbonate (also abbreviated as the "fluorinated cyclic carbonate" in the following) is not particularly limited, but is generally 6 or less and is preferably 4 or less, while a fluorinated cyclic carbonate having 1 or 2 fluorine atoms is most preferred.

Specific examples include, for instance, fluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, 4,4-difluoro-5,5-dimethylethylene carbonate and the like.

Among the preceding, fluorinated cyclic carbonates particularly preferred for use in combination with the isocyanate compound according to the present invention can be exemplified by fluoroethylene carbonate, 4-(fluoromethyl)ethylene carbonate, 4,4-difluoroethylene carbonate, and 4,5-difluoroethylene carbonate. Using the foregoing is more appropriate, since they form a stable interface protective coating.

The molecular weight of the fluorinated cyclic carbonate is not particularly limited and may be freely selected insofar as the effects of the present invention are not substantially impaired; however, it is generally 50 or more and preferably 100 or more and generally 250 or less and preferably 200 or less. Within those ranges, the solubility of the fluorinated cyclic carbonate towards the non-aqueous electrolyte solution can be readily secured, and the effect of the present invention is readily brought out. The method for producing the fluorinated unsaturated cyclic carbonate is not particularly limited, and the fluorinated unsaturated cyclic carbonate may be produced in accordance with an arbitrarily selected known method.

The fluorinated cyclic carbonate may be used singly as one type, or as two or more concurrent types in any combinations and ratios. In addition, the content of the fluorinated cyclic carbonate (or the total content when two or more are used) in the non-aqueous electrolyte solution is not particularly limited and may be freely selected insofar as the effects of the present invention are not substantially impaired; however, it is generally 0.01 mass % or more and is preferably 0.1 mass % or more and more preferably 0.2 mass % or more and is generally 90 mass % or less and is preferably 85 mass % or less and more preferably 80 mass % or less. When this range is obeyed, the cycle characteristics of the non-aqueous electrolyte secondary battery can be improved and the reduction in the discharge capacity retention rate that is associated with a decline in the high-temperature storage characteristics can be inhibited, while an excessive resistance increase can be suppressed.

When the fluorinated cyclic carbonate is used as a solvent, its content in the non-aqueous electrolyte solution is generally 5 mass % or more and is preferably 7 mass % or more and more preferably 10 mass % or more and is generally 90 mass % or less and is preferably 70 mass % or less and more preferably 50 mass % or less. Within these ranges, there can be suppressed side decomposition reactions in the non-aqueous electrolyte solution upon high-voltage operation of the battery, battery durability can be enhanced, and extreme drops in the electrical conductivity of the non-aqueous electrolyte solution can be suppressed.

(Fluorine Atom-Containing Unsaturated Cyclic Carbonate)

A cyclic carbonate that contains both an unsaturated bond and the fluorine atom (also abbreviated as the "fluorinated unsaturated cyclic carbonate" in the following) is also preferably used as the previously described fluorinated cyclic carbonate. The number of fluorine atoms in this fluorinated unsaturated cyclic carbonate is not particularly limited, but is generally 6 or less and is preferably 4 or less, while a fluorinated unsaturated cyclic carbonate having 1 or 2 fluorine atoms is most preferred.

Examples of the fluorinated unsaturated cyclic carbonate include, for instance, a fluorinated vinylene carbonate derivative or a fluorinated ethylene carbonate derivative substituted with an aromatic ring or a substituent having a carbon-carbon double bond.

Examples of fluorinated vinylene carbonate derivatives include, for instance, 4-fluorovinylene carbonate, 4-fluoro-5-methylvinylene carbonate, 4-fluoro-5-phenylvinylene carbonate, 4-allyl-5-fluorovinylene carbonate, 4-fluoro-5-vinylvinylene carbonate and the like.

Examples of fluorinated ethylene carbonate derivatives substituted with an aromatic ring or with a substituent having a carbon-carbon double bond include, for instance, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate and the like.

Examples of particularly preferred fluorinated unsaturated cyclic carbonates that can be used concomitantly with the isocyanate compound according to the present invention include, for instance, 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate and the like. Using the foregoing is more appropriate, since they form a stable interface protective coating.

The molecular weight of the fluorinated unsaturated cyclic carbonate is not particularly limited and may be freely selected insofar as the effects of the present invention are not substantially impaired; however, it is generally 50 or more and preferably 100 or more and generally 250 or less and preferably 200 or less. Within those ranges, the solubility of the fluorinated cyclic carbonate towards the non-aqueous electrolyte solution can be readily secured, and the effect of the present invention is readily brought out. The method for producing the fluorinated unsaturated cyclic carbonate is not particularly limited, and the fluorinated unsaturated cyclic carbonate may be produced in accordance with an arbitrarily selected known method.

The fluorinated unsaturated cyclic carbonate may be used singly as one type, or as two or more concurrent types in any combinations and ratios. In addition, the content of the fluorinated unsaturated cyclic carbonate (or the total content when two or more are used) in the non-aqueous electrolyte solution is not particularly limited and may be freely selected insofar as the effects of the present invention are not substantially impaired; however, it is generally 0.01 mass % or more and is preferably 0.1 mass % or more and more preferably 0.2 mass % or less and is generally 5 mass % or less and is preferably 4 mass % or less and more preferably 3 mass % or less. When this range is obeyed, the cycle characteristics of the non-aqueous electrolyte secondary battery can be improved and the reduction in the discharge capacity retention rate that is associated with a decline in the high-temperature storage characteristics can be inhibited, while the increase in the resistance caused by excessive film formation can be suppressed.

(Dinitrile Compound Represented by General Formula (6))

The dinitrile compound represented by general formula (6) forms a film on the electrode surface and thus has the effect of improving battery life.

[Chem. 12]

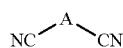

(6)

(In the general formula (6), A is a $C_1$-$C_{10}$ organic group that is constituted of atoms selected from the group consisting of hydrogen atom, carbon atom, nitrogen atom, oxygen atom, sulfur atom, phosphorus atom, and halogen atom.)

The $C_1$-$C_{10}$ organic group that is constituted of atoms selected from the group consisting of hydrogen atom, carbon atom, nitrogen atom, oxygen atom, sulfur atom, phosphorus atom, and halogen atom denotes, in addition to organic groups comprising carbon atoms and hydrogen atoms, also organic groups that may comprise nitrogen atom, oxygen atom, sulfur atom, phosphorus atom or halogen atom. The organic groups that may comprise nitrogen atom, oxygen atom, sulfur atom, phosphorus atom or halogen atom include organic groups in which some of the carbon atoms in the skeleton are substituted with any of the foregoing atoms, or organic groups having a substituent that is made up of the foregoing atoms.

The molecular weight of the dinitrile compound is not particularly limited, and may be any molecular weight so long as the effect of the present invention is not significantly impaired thereby. The molecular weight is preferably 65 or more, more preferably 80 or more, and yet more preferably 90 or more. The molecular weight is preferably 200 or less, more preferably 160 or less, and yet more preferably 135 or less. Within the above ranges, the solubility of the dinitrile compound towards the non-aqueous electrolyte solution is readily secured, and the effect of the present invention is readily brought out. The method for producing the dinitrile compound is not particularly limited, and the compound may be produced in accordance with an arbitrarily selected known method.

Specific examples of A in the general formula (6) include, for instance, alkylene groups or derivatives thereof, alkenylene groups or derivatives thereof, cycloalkylene groups or derivatives thereof, alkynylene groups or derivatives thereof, cycloalkenylene groups or derivatives thereof, arylene groups or derivatives thereof, carbonyl groups or derivatives thereof, sulfonyl groups or derivatives thereof, sulfinyl groups or derivatives thereof, phosphonyl groups or derivatives thereof, phosphinyl groups or derivatives thereof, amide groups or derivatives thereof, imide groups or derivatives thereof, ether groups or derivatives thereof, thioether groups or derivatives thereof, borinic acid groups or derivatives thereof, and borane groups or derivatives thereof.

Preferred among the foregoing, in terms of enhancing battery characteristics, are alkylene groups or derivatives thereof, alkenylene groups or derivatives thereof, cycloalkylene groups or derivatives thereof, alkynylene groups or derivatives thereof, and arylene groups or derivatives thereof. More preferably, A is a $C_3$ to $C_5$ organic group optionally having a substituent.

The compound represented by general formula (6) can be specifically exemplified by malononitrile, succinonitrile, glutaronitrile, adiponitrile, pimelonitrile, suberonitrile, azelanitrile, sebaconitrile, undecanedinitrile, dodecanedinitrile, methylmalonotrile, ethylmalonotrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, and 3,3'-(ethylenedithio)dipropionitrile.

Among the preceding, malononitrile, succinonitrile, glutaronitrile, adiponitrile, pimelonitrile, suberonitrile, azelanitrile, sebaconitrile, undecanedinitrile, dodecanedinitrile, and fumaronitrile are preferred from the standpoint of improving the storage characteristics. Glutaronitrile, adiponitrile, pimelonitrile, and suberonitrile are particularly preferred because they provide a particularly good improvement in the storage characteristics and little deterioration due to secondary reactions at the electrodes. In general with dinitrile compounds, the proportion of the nitrile group in a single molecule increases and the viscosity of the molecule rises as the molecular weight declines, while the boiling point of the compound rises as the molecular weight increases. Therefore, glutaronitrile, adiponitrile, and pimelonitrile are highly preferred from the standpoint of raising the production efficiency.

The dinitrile compound represented by formula (6) may be used singly as one type, or as two or more concurrent types in any combinations and ratios. There are no limitations on the amount of incorporation, with reference to the overall non-aqueous electrolyte solution of the present invention, of the dinitrile compound, and this amount may be freely selected as long as the effects of the present inventions are not significantly impaired. However, incorporation is generally carried out, with reference to the non-aqueous electrolyte solution of the present invention, at a concentration of generally 0.001 mass % or more, preferably 0.1 mass % or more, more preferably 0.3 mass % or more and generally 10 mass % or less, preferably 5 mass % or less, and more preferably 3 mass % or less. If the abovementioned ranges are satisfied, the effects on output characteristic, load characteristic, low-temperature characteristic, cycle characteristic, high-temperature storage characteristic and so forth become more pronounced.

An overcharge preventing agent can be used in the non-aqueous electrolyte solution of the present invention with a view to effectively suppressing bursting/ignition of the battery, for instance in an overcharged state of the non-aqueous electrolyte battery. Examples of overcharge preventing agents include, for instance, aromatic compounds such as biphenyl, alkyl biphenyl, terphenyl, partially hydrogenated products of terphenyl, cyclohexyl benzene, t-butylbenzene, t-amylbenzene, diphenyl ether, dibenzofuran or the like; partially fluorinated products of the abovementioned aromatic compounds, for instance 2-fluorobiphenyl, o-cyclohexylfluorobenzene, p-cyclohexylfluorobenzene or the like; and fluorine-containing anisole compounds such as 2,4-difluoroanisole, 2,5-difluoroanisole, 2,6-difluoroanisole, 3,5-difluoroanisole or the like. Preferred aromatic compounds among the foregoing are biphenyl, alkylbiphenyl, terphenyl, partially hydrogenated products of terphenyl, cyclohexylbenzene, t-butylbenzene, t-amylbenzene, diphenyl ether, di-benzofuran or the like. The foregoing may be used as a single type or concomitantly as two or more types. When using two or more types concomitantly, then there is preferably used, in particular, a combination of cyclohexylbenzene and t-butylbenzene or t-amylbenzene; or at least one type selected from among aromatic compounds containing no oxygen atoms, for instance, biphenyl, alkylbiphenyl, terphenyl, partially hydrogenated products of terphenyl, cyclohexylbenzene, t-butylbenzene, t-amylbenzene or the like, and at least one type selected from among oxygen-containing aromatic compounds such as diphenyl ether, dibenzofuran or the like, in terms of striking a balance between the overcharge prevention characteristic and high-temperature storage characteristic.

The blending amount of the overcharge preventing agent is not particularly limited, and may be any blending amount, so long as the effect of the present invention is not significantly impaired thereby. The blending amount is generally 0.1 mass % or more and is preferably 0.2 mass % or more, more preferably 0.3 mass % or more and even more preferably 0.5 mass % or more, and is generally 5 mass % or less and is preferably 3 mass % or less and more preferably 2 mass % or less. When this range is obeyed, a satisfactory overcharge-inhibiting effect can be obtained, while battery characteristics such as the high-temperature storage characteristics can be secured.

(Other Auxiliary Agents)

The non-aqueous electrolyte solution of the present invention may contain an auxiliary agent other than the previously described unsaturated bond-containing cyclic carbonate, fluorine atom-containing cyclic carbonate, fluorine atom-containing unsaturated cyclic carbonate, dinitrile compound represented by general formula (6), and overcharge inhibitor.

For example, at least one selection from the group consisting of monofluorophosphate salts, difluorophosphate salts, tetrafluoroborate salts, and compounds represented by the following general formulas (2) to (5) (this selection is also abbreviated below as a "compound such as a monofluorophosphate salt and so forth."). The compound such as a monofluorophosphate salt and so forth forms a good-quality composite film through its combination with the isocyanate compound according to the present invention and substantially raises the stability of the electrode structure as a whole, including this film, and thereby makes it possible to achieve an excellent durability and excellent load characteristics that cannot be achieved just by the use of either alone.

[Chem. 13]

(2)

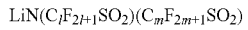
LiN(C$_l$F$_{2l+1}$SO$_2$)(C$_m$F$_{2m+1}$SO$_2$)

[Chem. 14]

(3)

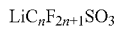
LiC$_n$F$_{2n+1}$SO$_3$

[Chem. 15]

(4)

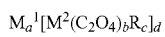
M$_a^1$[M$^2$(C$_2$O$_4$)$_b$R$_c$]$_d$

[Chem. 16]

(5)

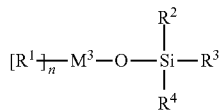

There are no particular limitations on the countercation in the monofluorophosphate salt, difluorophosphate salt, and tetrafluoroborate salt, and this countercation can be exemplified by metal elements such as Li, Na, K, Mg, Ca, Fe, and Cu and by primary to quaternary ammonium as represented by NR$^5$R$^6$R$^7$R$^8$ (In the formula, R$^5$ to R$^8$ each independently represent a hydrogen atom or a C$_1$-C$_{12}$ organic group). The C$_1$-C$_{12}$ organic group encompassed by R$^5$ to R$^8$ can be exemplified by possibly halogen-substituted alkyl groups, possibly halogen-substituted cycloalkyl groups, possibly halogen-substituted aryl groups, and nitrogenous heterocyclic groups. R$^5$ to R$^8$ are each preferably a hydrogen atom, alkyl group, cycloalkyl group, or nitrogenous heterocyclic group. Among these countercations, lithium, sodium, potassium, magnesium, calcium, and NR$^5$R$^6$R$^7$R$^8$ are preferred from the standpoint of the battery characteristics when used in a lithium secondary battery, while lithium is particularly preferred.

Compounds represented by the general formula (2), being compounds that exhibit the same effects, may also be preferably used. The 1 and m in the general formula (2) are integers from 0 to 4 and may have the same value or may differ from one another. When the size of the anion in such a salt is too large, in general the ion mobility may decline and/or the film resistance may increase.

[Chem. 17]

$$\text{LiN}(C_lF_{2l+1}SO_2)(C_mF_{2m+1}SO_2) \tag{2}$$

Compounds represented by the general formula (3) also have the same effects, and thus, for the same reasons as provided above, n is an integer with a value of 0 to 4.

[Chem. 18]

$$\text{LiC}_nF_{2n+1}SO_3 \tag{3}$$

Compounds represented by the general formula (4) are salts in which an oxalato complex is the anion, and they have the same effects as the above-described monofluorophosphate salts and so forth. $M^1$ in the general formula (4) is an element selected from Groups 1 and 2 of the Periodic Table, and aluminum (Al). When viewed from the perspective of the battery characteristics when used in a lithium secondary battery, $M^1$ is preferably lithium, sodium, potassium, magnesium, or calcium and particularly preferably is lithium. $M^2$ represents an element selected from the transition metals and Groups 13, 14, and 15 of the Periodic Table, among which boron and phosphorus are particularly preferred from the standpoint of the electrochemical stability when used in a lithium secondary battery. R is a group selected from the halogens, $C_1$-$C_{11}$ alkyl groups, and $C_1$-$C_{11}$ halogen-substituted alkyl groups. a and b represent positive integers, c represents 0 or a positive integer, and d represents an integer from 1 to 3.

[Chem. 19]

$$M_a^1[M^2(C_2O_4)_bR_c]_d \tag{4}$$

The R in the general formula (4) can be specifically exemplified by the fluorine atom, chlorine atom, methyl group, trifluoromethyl group, ethyl group, pentafluoroethyl group, propyl group, isopropyl group, butyl group, sec-butyl group, and tert-butyl group, whereamong the fluorine atom and trifluoromethyl group are particularly preferred.

Compounds represented by the general formula (5) also have the same effects as the previously described monofluorophosphate salts and so forth. $M^3$ in the general formula (5) represents a metal atom, the phosphorus atom, the boron atom, or P=O. $R^4$ represents a $C_1$-$C_{11}$ alkyloxy group, a silyloxy group, or a $C_1$-$C_{11}$ alkylsilyloxy group. n represents the number of $R^1$ groups bonded to $M^3$ and determined by a valence of $M^3$. When n is two or more, the $R^1$ groups may be the same or may differ from one another. $R^2$ to $R^4$ each independently represent a $C_1$-$C_{11}$ alkyl group, $C_1$-$C_{11}$ alkenyl group, $C_1$-$C_{11}$ alkyloxy group, or $C_6$-$C_{11}$ aryl group.

[Chem. 20]

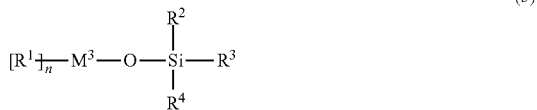

(5)

$M^3$ in the general formula (5) can be specifically exemplified by magnesium, boron, aluminum, silicon, phosphorus, P=O, scandium, titanium, vanadium, chromium, manganese, iron, cobalt, nickel, copper, zinc, germanium, tin, yttrium, zirconium, and niobium. Among the preceding, aluminum, the boron atom, the phosphorus atom, P=O, titanium, and zirconium are particularly preferred.

$R^1$ in the general formula (5) can be exemplified by the methoxy group, ethoxy group, propoxy group, isopropoxy group, normal-butoxy group, sec-butoxy group, tert-butoxy group, pentoxy group, hexyloxy group, phenoxy group, trimethylsilyloxy group, triethylsilyloxy group, trimethoxysilyloxy group, and triethoxysilyloxy group. Preferred among the preceding are the methoxy group, ethoxy group, propoxy group, isopropoxy group, normal-butoxy group, and trimethylsilyloxy group.

$R^2$, $R^3$, and $R^4$ in the general formula (5) can be specifically exemplified by the methyl group, ethyl group, vinyl group, propyl group, isopropyl group, 1-propenyl group, 2-propenyl group, 1-propynyl group, 2-propynyl group, butyl group, sec-butyl group, t-butyl group, 1-butenyl group, 2-butenyl group, 3-butenyl group, 4-methyl-2-propenyl group, 1-methylenepropyl group, 1-methyl-2-propenyl group, 1,2-dimethylvinyl group, 1-butynyl group, 2-butynyl group, 3-butynyl group, pentyl group, 1-methylbutyl group, 2-methylbutyl group, 3-methylbutyl group, 1-methyl-2-propyl group, 2,2-dimethylpropyl group, phenyl group, methylphenyl group, ethylphenyl group, pentamethylphenyl group, methoxy group, ethoxy group, propyloxy group, isopropyloxy group, butoxy group, sec-butoxy group, tert-butoxy group, pentoxy group, hexyloxy group, and phenoxy group. $R^2$ to $R^4$ desirably have 4 carbons or less from the standpoint of the solubility in the non-aqueous electrolyte solution, and preferred specific examples in this regard are the methyl, ethyl, propyl, isopropyl, normal-butyl, isobutyl, sec-butyl, methoxy, ethoxy, propoxy, isopropoxy, normal-butoxy, isobutoxy, and sec-butoxy group. The methyl group is the most preferred among the preceding.

Specific examples of the compound represented by the general formula (5) include: magnesium bis(trimethylsiloxide), tris(trimethylsilyl)borate, tris(trimethoxysilyl)borate, tris(triethylsilyl)borate, tris(triethoxysilyl)borate, tris(dimethylvinylsilyl)borate, tris(diethylvinylsilyl)borate, aluminum tris(trimethylsiloxide), dimethoxyaluminoxytrimethylsilane, dimethoxyaluminoxytrimethoxysilane, diethoxyaluminoxytrimethylsilane, diethoxyaluminoxytriethoxysilane, dipropyloxyaluminoxytrimethylsilane, dibutoxyaluminoxytrimethylsilane, dibutoxyaluminoxytrimethoxysilane, dibutoxyaluminoxytriethylsilane, dibutoxyaluminoxytriethoxysilane, dipropoxyaluminoxytriethoxysilane, dibutoxyaluminoxytripropylsilane, dibutoxyaluminoxytrimethoxysilane, dibutoxyaluminoxytriethoxysilane, dibutoxyaluminoxytripropyloxysilane, dibutoxyaluminoxytriphenoxysilane, tris(trimethylsilyl)phosphate, tris(triethylsilyl)phosphate, tris(tripropylsilyl)phosphate, tris(triphenylsilyl)phosphate, tris(trimethoxysilyl)phosphate, tris(triethoxysilyl)phosphate, tris(triphenoxysilyl)phosphate, tris(dimethylvinylsilyl)phosphate, tris(diethylvinylsilyl)phosphate, scandium tris(trimethylsiloxide), titanium tetrakis(trimethylsiloxide), titanium tetrakis(triethylsiloxide), titanium tetrakis(trimethoxysiloxide), titaniumoxybis(trimethylsiloxide), vanadiumoxytris(trimethylsiloxide), zinc bis(trimethylsiloxide), germanium tetrakis(trimethylsiloxide), tin tetrakis(trimethylsiloxide), yttrium tris(trimethylsiloxide), zirconium tetrakis(trimethylsiloxide), and niobium pentakis(trimethylsiloxide).

The following are preferred examples of the compound such as a monofluorophosphate salt and so forth: lithium monofluorophosphate, potassium monofluorophosphate, sodium monofluorophosphate, lithium difluorophosphate, potassium difluorophosphate, sodium difluorophosphate, lithium tetrafluoroborate, potassium tetrafluoroborate, sodium tetrafluoroborate, lithium bis(fluorosulfonyl)imide, lithium bis(trifluoromethanesulfonyl)imide, lithium bis(pentafluoroethanesulfonyl)imide, lithium (fluorosulfonyl)(trifluoromethanesulfonyl)imide, lithium (fluorosulfonyl)(pentafluoroethanesulfonyl)imide, lithium (trifluoromethanesulfonyl)(pentafluoroethanesulfonyl) imide, lithium fluorosulfonate, lithium trifluoromethanesulfonate, lithium pentafluoroethanesulfonate, lithium bis(oxalato)borate, potassium bis(oxalato)borate, sodium bis(oxalato)borate, lithium difluoro(oxalato)borate, potassium difluoro(oxalato)borate, sodium difluoro(oxalato)borate, lithium tris(oxalato)phosphate, potassium tris(oxalato)phosphate, sodium tris(oxalato)phosphate, lithium difluorobis(oxalato)phosphate, potassium difluorobis(oxalato)phosphate, sodium difluorobis(oxalato)phosphate, lithium tetrafluoro(oxalato)phosphate, potassium tetrafluoro(oxalato)phosphate, sodium tetrafluoro(oxalato)phosphate, tris(trimethylsilyl) borate, tris(trimethoxysilyl) borate, tris(trimethylsilyl) phosphate, tris(trimethoxysilyl) phosphate, dimethoxyaluminoxytrimethoxysilane, diethoxyaluminoxytriethoxysilane, dipropoxyaluminoxytriethoxysilane, dibutoxyaluminoxytrimethoxysilane, dibutoxyaluminoxytriethoxysilane, titanium tetrakis(trimethylsiloxide), and titanium tetrakis(triethylsiloxide).

More preferred among the preceding are lithium monofluorophosphate, lithium difluorophosphate, lithium tetrafluoroborate, lithium bis(fluorosulfonyl)imide, lithium bis(trifluoromethanesulfonyl)imide, lithium fluorosulfonate, lithium trifluoromethanesulfonate, lithium bis(oxalato)borate, lithium difluoro(oxalato)borate, lithium tris(oxalato) phosphate, lithium difluorobis(oxalato)phosphate, lithium tetrafluoro(oxalato)phosphate, tris(trimethylsilyl) borate, and tris(trimethylsilyl) phosphate.

The compound such as a monofluorophosphate salt and so forth may be used singly as one type, or as two or more concurrent types in any combinations and ratios. The content in the non-aqueous electrolyte solution of the compound such as a monofluorophosphate salt and so forth (the total content when two or more are used) is not particularly limited, but is in the range generally from 0.01 mass % or more and preferably 0.05 mass % or more and more preferably 0.1 mass % or more to generally 5 mass % or less and preferably 4 mass % or less and more preferably 3 mass % or less. When this content is too low, the chemical and physical stability of the film may be unsatisfactory; when this content is too high, the insulating character of the film is increased and the discharge capacity may be reduced due to the increase in the resistance. A synergistic effect with the isocyanate compound according to the present invention is readily obtained when the content of these compounds is in the indicated range, which can provide an even greater suppression of the reductive degradation reactions of the non-aqueous solvent that occur during charging and can improve the battery life, e.g., the cycle characteristics and high-temperature storage characteristics, raise the charge/discharge efficiency of the battery, and improve the low-temperature characteristics.

The method of incorporating the compound such as a monofluorophosphate salt and so forth in the non-aqueous electrolyte solution is not particularly limited and may be exemplified by methods in which the compound such as a monofluorophosphate salt and so forth, which has been synthesized by a known means, is directly added to the electrolyte solution and by methods in which the compound such as a monofluorophosphate salt and so forth is generated within the battery or in the electrolyte solution. The method of generating the compound such as a monofluorophosphate salt and so forth can be exemplified by methods in which a compound other than the compound such as a monofluorophosphate salt and so forth is added and generation is then carried out by, for example, the oxidation or hydrolysis of a constituent element of the battery, for example, the electrolyte solution. Another example is a method in which the battery is fabricated and generation is induced by the application of an electrical load, for example, charge/discharge.

The content of a compound such as monofluorophosphate salt in the non-aqueous electrolyte solution or the non-aqueous electrolyte battery can be quantitated by, for example, ion chromatography or F nuclear magnetic resonance spectroscopy.

The weight ratio between the isocyanate compound according to the present invention and a compound such as monofluorophosphate salt is generally in the range from 1:500 to 300:1, preferably 1:80 to 40:1, and more preferably 1:30 to 1.5:1.

These other auxiliary agents can be exemplified by the following, which have the ability to improve the cycle characteristics and the capacity retention characteristics after high-temperature storage: carbonate compounds such as erythritan carbonate, spirobisdimethylene carbonate, methoxyethyl methyl carbonate, and so forth; carboxylic acid anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, phenylsuccinic anhydride, and so forth; spiro compounds such as 2,4,8,10-tetraoxaspiro[5.5]undecane, 3,9-divinyl-2,4,8,10-tetraoxaspiro[5.5]undecane, and so forth; sulfur-containing compounds such as ethylene sulfite, 1,3-propane sultone, 1-fluoro-1,3-propane sultone, 2-fluoro-1,3-propane sultone, 3-fluoro-1,3-propane sultone, 1-propene-1,3-sultone, 1-fluoro-1-propene-1,3-sultone, 2-fluoro-1-propene-1,3-sultone, 3-fluoro-1-propene-1,3-sultone, 1,4-butane sultone, 1-butene-1,4-sultone, 3-butene-1,4-sultone, methyl fluorosulfonate, ethyl fluorosulfonate, methyl methanesulfonate, ethyl methanesulfonate, busulfan, sulfolene, diphenyl sulfone, N,N-dimethylmethanesulfonamide, N,N-diethylmethanesulfonamide, and so forth; hydrocarbon compounds such as heptane, octane, nonane, decane, cycloheptane, and so forth; and fluorine-containing aromatic compounds such as fluorobenzene, difluorobenzene, hexafluorobenzene, benzotrifluoride, and so forth. The foregoing auxiliary agents may be used as a single type or concomitantly as two or more types.

The content of the above-described auxiliary agent (the total content when two or more are used) in the non-aqueous electrolyte solution is not particularly limited, but is generally 0.01 mass % or more and is preferably 0.1 mass % or more and more preferably 0.2 mass % or more and is generally 5 mass % or less and is preferably 3 mass % or less and more preferably 1 mass % or less. Within the indicated range, negative effects on the battery can be suppressed while at the same time the effects of the auxiliary agent can be satisfactorily manifested.

The non-aqueous electrolyte solution described above encompasses a non-aqueous electrolyte solution that is present inside the non-aqueous electrolyte battery that is disclosed in the present invention. Specific such instances include an instance where the constituent elements of the non-aqueous electrolyte solution such as the lithium salt, the solvent, the auxiliary agents and so forth are synthesized separately, and there is prepared a non-aqueous electrolyte solution out of the substantially isolated constituent elements, and then the non-aqueous electrolyte solution is poured into a battery assembled separately, to yield a non-aqueous electrolyte solution in a non-aqueous electrolyte battery; an instance where the constituent elements of the non-aqueous electrolyte solution of the present invention are provided individually in the battery, and are then mixed within the battery, to yield as a result a composition identical to that of the non-aqueous electrolyte solution of the present invention; or an instance where the compounds that make up the non-aqueous electrolyte solution of the present invention are generated in the non-aqueous electrolyte battery, to yield thereby a composition identical to that of the non-aqueous electrolyte solution of the present invention.

[2. Non-Aqueous Electrolyte Secondary Battery]

The non-aqueous electrolyte secondary battery of the present invention has a positive electrode and a negative electrode capable of the absorbing and releasing of a metal ion, and a separator, infra, and the non-aqueous electrolyte solution described in the preceding.

<2-1. Battery Structure>

Other than the non-aqueous electrolyte solution, the non-aqueous electrolyte secondary battery of the present invention has the same structure as heretofore known non-aqueous electrolyte secondary batteries. It typically has a configuration in which a positive electrode and a negative electrode are stacked with each other, with a porous membrane (the separator) impregnated with the non-aqueous electrolyte solution of the present invention interposed therebetween, and in which these are housed in a case (external housing). Thus, the shape of the non-aqueous electrolyte secondary battery of the present invention is not particularly limited and may be any selection from cylindrical, prismatic, laminate, coin type, large scale, and so forth.

<2-2. Non-Aqueous Electrolyte Solution>

The non-aqueous electrolyte solution described in the preceding is used as a non-aqueous electrolyte solution in the non-aqueous electrolyte secondary battery of the present invention. Moreover, within a range that does not depart from the essential features of the present invention, a mixture of the non-aqueous electrolyte solution of the present invention with another non-aqueous electrolyte solution may also be used.

<2-3. Negative Electrode>

The negative electrode active material that is used in the negative electrode is explained next. The negative electrode active material is not particularly limited, so long as it is capable of electrochemically absorbing and releasing metal ions. Specific examples thereof include, for instance, carbonaceous materials, alloy-based materials, lithium-containing metal complex oxide materials and the like. The foregoing may be used singly as one type, or concomitantly in the form of any combination of two or more types.

(Negative Electrode Active Material)

Examples of the negative electrode active material include, for instance, carbonaceous materials, alloy-based materials, lithium-containing metal complex oxide materials and the like.

The carbonaceous material used as the negative electrode active material is preferably selected from (1) natural graphite, (2) artificial carbonaceous materials and carbonaceous materials provided by subjecting an artificial graphitic material to at least one heat treatment in the range from 400 to 3,200° C., (3) a carbonaceous material wherein the negative electrode active material layer comprises at least two carbonaceous substances having different crystallinities and/or has an interface where such carbonaceous substances having different crystallinities are in contact with each other, and (4) a carbonaceous material wherein the negative electrode active material layer comprises at least two carbonaceous substances having different orientations and/or has an interface where such carbonaceous substances having different orientations are in contact with each other, because these provide a good balance between the initial irreversible capacity and the high current density charge/discharge characteristics. The carbonaceous materials of (1) to (4) may be used singly as one type, or as two or more concurrent types in any combinations and ratios.

Examples of the artificial carbonaceous substance and artificial graphitic substance of (2) include, for instance, natural graphite, coal-based coke, petroleum coke, coal-based pitch, petroleum pitch, and products obtained as a result of an oxidation treatment of the foregoing pitches; needle coke, pitch coke and carbon materials resulting from partial graphitization thereof; furnace black, acetylene black and organic pyrolysis products of pitch-based carbon fibers or the like; a carbonizable organic material or a carbonized product thereof; or a solution resulting from dissolving a carbonizable organic material in a low-molecular weight organic solvent such as benzene, toluene, xylene, quinoline, n-hexane or the like, or a carbonized product of the solution.

The alloy-based material that is used as the negative electrode active material is not particularly limited so long as it is capable of absorbing and releasing lithium, and may be any from among single lithium, or a single metal or alloy that forms a lithium alloy, or a compound, for instance an oxide, carbide, nitride, silicide, sulfide or phosphide of the foregoing. The single metal and alloy that forms a lithium alloy is preferably a material comprising a metal/semimetal element (excluding carbon) of groups 13 and 14, more preferably a single metal such as aluminum, silicon or tin (hereafter, also referred to as "specific metal elements" for short), as well as alloys or compounds that comprise the foregoing atoms. These metals be used singly as one type, or as two or more concurrent types in any combinations and ratios.

Examples of the negative electrode active material having at least one type of atom selected from among the specific metal elements include, for instance, a single metal of any one type of the specific metal elements; alloys comprising two or more types of the specific metal elements; alloys that comprise one type or two or more types of the specific metal elements plus another one type or two or more types of metal elements; compounds containing one type or two or more types of the specific metal elements; as well as complex compounds thereof, such as oxides, carbides, nitrides, silicides, sulfides or phosphides. The capacity of the battery can be increased through the use of these single metals, alloys and metal compounds as the negative electrode active material.

Examples of the complex compounds include, for instance, compounds wherein a plurality of types of elements, for instance single metals, alloys and non-metallic elements, are bonded to each other in complex manners. Specifically, in the case of silicon and tin, for instance, there can be used alloys of these elements with metals that do not act as a negative electrode. In the case of tin, for instance, there can be used a complex compound that comprises 5 to 6 elements including a combination of a metal, other than tin and silicon, that acts as a negative electrode, a metal that does not act as a negative electrode, and a non-metallic element.

From among the abovementioned negative electrode active materials there is preferably used, for instance, any one single metal of the specific metal elements, or an alloy of two or more types of the specific metal elements, or an oxide, carbide or nitride of the specific metal elements, on account of the substantial capacity per unit mass that is afforded in the resulting battery. In particular, a single metal, alloy, oxide, carbide, nitride or the like of silicon and/or tin is preferably used in terms of capacity per unit mass and environmental impact.

The lithium-containing metal complex oxide material used as the negative electrode active material is not particularly limited, so long as it is capable of absorbing and releasing lithium, but, in terms of high current density charge-discharge characteristic, is preferably a material that contains titanium and lithium, more preferably a lithium-containing complex metal oxide material that comprises titanium, and yet more preferably a complex oxide of lithium and titanium (hereafter also referred to as "lithium titanium complex oxide" for short). In particular, there is preferably used a negative electrode active material for non-aqueous electrolyte secondary batteries that comprises a lithium-titanium complex oxide having a spinel structure, since output resistance is significantly reduced in such a case.

Also preferred are composite oxides provided by substituting the lithium and/or titanium in the lithium titanium composite oxide with another metal element, for example, at least one element selected from the group consisting of Na, K, Co, Al, Fe, Ti, Mg, Cr, Ga, Cu, Zn, and Nb. This metal oxide is preferably a lithium titanium composite oxide with general formula (A) wherein $0.7 \leq x \leq 1.5$, $1.5 \leq y \leq 2.3$, and $0 \leq z \leq 1.6$ in the general formula (A), because this has a stable structure during lithium ion doping/dedoping.

$$Li_x Ti_y M_z O_4 \tag{A}$$

[In the formula (A), M denotes at least one element selected from the group consisting of Na, K, Co, Al, Fe, Ti, Mg, Cr, Ga, Cu, Zn and Nb.]

Among the compositions represented by the general formula (A), structures in which
 (a) $1.2 \leq x \leq 1.4$, $1.5 \leq y \leq 1.7$, $z=0$
 (b) $0.9 \leq x \leq 1.1$, $1.9 \leq y \leq 2.1$, $z=0$
 (c) $0.7 \leq x \leq 0.9$, $2.1 \leq y \leq 2.3$, $z=0$
are particularly preferred because they provide well-balanced battery properties.

Particularly preferred representative compositions of the above compounds include $Li_{4/3}Ti_{5/3}O_4$ for (a), $Li_1Ti_2O_4$ for (b) and $Li_{4/5}Ti_{11/5}O_4$ for (c). Preferred instances of a structure where $Z \neq 0$ include $Li_{4/3}Ti_{4/3}Al_{1/3}O_4$.

(X-Ray Parameter)

The d value (interlayer distance) of the (002 surface) lattice plane determined by X-ray diffraction by a method according to the Japan Society for the Promotion of Science (Gakushin) for the carbonaceous material is preferably 0.335 nm or more and is generally 0.360 nm or more and is preferably 0.350 nm or more and more preferably is 0.345 nm or more. In addition, the crystallite size (Lc) determined by x-ray diffraction by the Gakushin method for the carbonaceous material is preferably 1.0 nm or more and is more preferably 1.5 nm or more.

(Volume-Average Particle Diameter)

The volume-average particle diameter of the carbonaceous material, which denotes the average particle diameter (median diameter), referred to volume, and that is worked out by laser diffraction/scattering, is generally 1 μm or more, preferably 3 μm or more, yet more preferably 5 μm or more, and particularly preferably 7 μm or more, and is generally 100 μm or less, preferably 50 μm or less, more preferably 40 μm or less, yet more preferably 30 μm or less, and particularly preferably 25 μm or less.

When the volume-based average particle diameter is in the range indicated above, a loss in the initial battery capacity due to an increased irreversible capacity can be suppressed and, when a step of electrode fabrication by coating is employed, uniform coating of the electrode is also made possible.

The volume-based average particle diameter is measured by dispersing the carbon powder in a 0.2 mass % aqueous solution (approximately 10 mL) of the surfactant polyoxyethylene (20) sorbitan monolaurate and carrying out the measurement using a laser diffraction/scattering particle size distribution analyzer (LA-700 from Horiba, Ltd.). The median diameter obtained in the measurement is defined as the volume-average particle diameter of the carbonaceous material of the present invention.

(Raman R Value and Raman Half-Value)

The Raman R value of the carbonaceous material is the value measured using argon ion laser Raman spectroscopy and is generally 0.01 or more and is preferably 0.03 or more and more preferably 0.1 or more and is generally 1.5 or less and is preferably 1.2 or less, even more preferably 1 or less, and particularly preferably 0.5 or less.

The Raman half-width of the carbonaceous material around 1580 cm$^{-1}$ is not particularly limited, and is generally 10 cm$^{-1}$ or more, preferably 15 cm$^{-1}$ or more, and generally 100 cm$^{-1}$ or less, preferably 80 cm$^{-1}$ or less, yet more preferably 60 cm$^{-1}$ or less and particularly preferably 40 cm$^{-1}$ or less.

The Raman R value and the Raman half-value width are indices of the crystallinity of the carbonaceous material surface, and the carbonaceous material preferably has a suitable crystallinity from a chemical stability perspective and preferably has a crystallinity to a degree that the interlayer sites that intercalate the Li are not extinguished by charge/discharge. If the density of the negative electrode is increased through pressing after coating onto the collector, the crystals become readily oriented in a direction parallel to the electrode plate, then the load characteristic may be impaired.

When the Raman R value or the Raman half-value width is in the range indicated above, reactions between the carbonaceous material and the non-aqueous electrolyte solution can be inhibited and the decline in load characteristics due to the disappearance of sites can be suppressed.

The Raman spectrum is measured using a Raman spectrometer (Raman spectrometer, by JASCO) by filling a sample, through natural dropping, into a measurement cell, and causing the cell to rotate within a plane perpendicular to an argon-ion laser beam while irradiating the sample surface in the cell with the laser beam. In the obtained Raman spectrum there is calculated the intensity ratio $R(R=IB/IA)$ between the intensity IA of peak PA around 1580 cm$^{-1}$ and the intensity IB of peak PB around 1360 cm$^{-1}$. The Raman R value calculated in the above-described measurement is defined as the Raman R value of the carbonaceous material of the present invention. The half-width of the peak PA around 1580 cm$^{-1}$ of the obtained Raman spectrum is measured, and the measured half-width is defined as the Raman half-width of the carbonaceous material of the present invention.

The conditions for the aforementioned Raman measurement are as follows:
 wavelength of the argon ion laser: 514.5 nm
 laser power on sample: 15 to 25 mW
 resolution: 10 to 20 cm$^{-1}$
 measurement range: 1,100 cm$^{-1}$ to 1,730 cm$^{-1}$
 Raman R value, Raman half-value width: background processing
 smoothing: simple average, 5 point convolution (BET Specific Surface Area)

The BET specific surface area of the carbonaceous material is the value of the specific surface area measured using the BET method and is generally 0.1 m$^2 \cdot$g$^{-1}$ or more and is preferably 0.7 m²·g⁻¹ or more, more preferably 1.0 m²·g⁻¹ or more, and particularly preferably 1.5 m²·g⁻¹ or more and is generally 100 m²·g⁻¹ or less and is preferably 25 m²·g⁻¹ or less, more preferably 15 m²·g⁻¹ or less, and particularly preferably 10 m²·g⁻¹ or less.

When the value of the BET specific surface area is in the indicated range, lithium precipitation to the electrode surface can be inhibited and gas generation due to reactions with the non-aqueous electrolyte solution can also be inhibited.

The measurement of the specific surface area by the BET method is carried out using a surface area analyzer (a fully automatic surface area analyzer from Ohkura Riken Co., Ltd.) by subjecting the sample to a preliminary drying for 15 minutes at 350° C. under a nitrogen current and carrying out the BET nitrogen adsorption single-point method using the gas flow technique and using a nitrogen-helium mixed gas precisely adjusted to provide a value of 0.3 for the relative pressure of the nitrogen versus atmospheric pressure. The specific surface area worked out according to the above-described measurement is defined as the BET specific surface area of the negative electrode active material of the present invention.

(Circularity)

The circularity measured as an index of the spherical shape of the carbonaceous material preferably falls in the range given below. The circularity is defined as "circularity=(length of the circumference of the equivalent circle having the same area as the particle projected shape)/(length of the actual circumference of the particle projected shape)", and a circularity of 1 indicates a theoretically perfect sphere. A circularity for the carbonaceous material particles with a diameter in the 3 to 40 μm range closer to 1 is more desirable, and is preferably 0.1 or more, more preferably 0.5 or more, even more preferably 0.8 or more, still more preferably 0.85 or more, and particularly preferably 0.9 or more.

The high current density charge/discharge characteristics are improved as, at higher circularity values, the packing behavior is better and the particle-to-particle resistance is thus kept lower. Accordingly, a higher circularity as in the range indicated above is preferred.

The circularity is measured using a flow-type particle image analyzer (FPIA from the Sysmex Corporation). Specifically, approximately 0.2 g of the sample is dispersed in a 0.2 mass % aqueous solution (approximately 50 mL) of the surfactant polyoxyethylene (20) sorbitan monolaurate and is exposed for 1 minute to 28 kHz ultrasound at an output of 60 W; the detection range is then set to 0.6 to 400 μm; and measurement is carried out on the particles in the 3 to 40 μm diameter range. The orientation ratio as calculated in the above-described measurement is defined as the orientation ratio of the carbonaceous material of the present invention.

There are no particular limitations on methods for increasing the circularity, but a carbonaceous material made into a spherical shape by the execution of a sphericizing treatment is preferred because the shape of the interparticle voids is then ordered when this is made into the electrode body. The sphericizing treatment can be exemplified by the following: methods in which the spherical shape is mechanically approximated through the application of shear force or compressive force; mechanical/physical treatment methods in which a plurality of finely divided particles are granulated using a binder or the attachment forces intrinsic to the particles themselves.

(Tap Density)

The tap density of the carbonaceous material is generally 0.1 g·cm⁻³ or more and is preferably 0.5 g·cm⁻³ or more, more preferably 0.7 g·cm⁻³ or more, and particularly preferably 1 g·cm⁻³ or more. It is preferably 2 g·cm⁻³ or less, more preferably 1.8 g·cm⁻³ or less, and particularly preferably 1.6 g·cm⁻³ or less. The battery capacity can be ensured and the interparticle resistance can be kept from increasing when the tap density is in the indicated range.

The tap density is measured as follows: the sample is passed through a sieve with an aperture of 300 μm down into a 20 cm³ tapping cell and the sample is filled to the upper end surface of the cell; using a powder density analyzer (for example, a Tap Denser from Seishin Enterprise Co., Ltd.), 1000 taps with a stroke length of 10 mm are then administered; and the tap density is calculated from the volume at this point and the mass of the sample. The tap density calculated according to the above measurement is defined as the tap density of the negative electrode active material of the present invention.

(Orientation Ratio)

The orientation ratio of the carbonaceous material is generally 0.005 or more and is preferably 0.01 or more and more preferably 0.015 or more and is generally 0.67 or less. Excellent high-density charge/discharge characteristics can be ensured when the orientation ratio is in the indicated range. The upper limit of the abovementioned range is the theoretical upper limit value of the orientation ratio of the carbonaceous material.

The orientation ratio is measured by X-ray diffraction after pressure-molding of a sample. A sample of 0.47 g is stuffed into a 17 mm-diameter molding machine, and is compressed at 58.8 MNm⁻², to yield a molded product that is then measured by X-ray diffraction by being set flush with the surface of a measurement sample holder, using clay. The ratio represented by (110) diffraction peak intensity/(004) diffraction peak intensity is calculated from the peak intensities of (110) diffraction and (004) diffraction for carbon. The orientation ratio as calculated in the above-described measurement is defined as the orientation ratio of the carbonaceous material of the present invention.

The X-ray diffraction measurement conditions are as follows. Herein, "2θ" is the diffraction angle.
 target: Cu (Kα line) graphite monochromator
 slits:
 divergence slit=0.5 degrees
 receiving slit=0.15 mm
 scattering slit=0.5 degrees
 Measurement range and step angle/measurement time:
 (110) plane: 75°≤2θ≤80° 1°/60 sec
 (004) plane: 52°≤2θ≤57° 1°/60 sec (Aspect Ratio (Powder))

The aspect ratio of the carbonaceous material is generally 1 or more and is generally 10 or less and is preferably 8 or less and more preferably 5 or less. When the aspect ratio is within this range, streaking during plate fabrication can be inhibited and a more uniform coating is made possible and as a consequence excellent high current density charge/discharge characteristics can be ensured. The lower limit of the abovementioned range is a theoretical lower limit value of the aspect ratio of the carbonaceous material.

The aspect ratio is measured through observation of enlarged scanning electron micrographs of the carbonaceous material particles. There are selected 50 arbitrary graphite particles fixed to the edge face of metal of thickness no greater than 50 μm. The particles are observed each three-dimensionally through rotation and tilting of a stage to which the sample is fixed. The longest length a, and the shortest length b perpendicular thereto, of each carbonaceous material particle, are measured, and the average value of a/b is worked out." The aspect ratio (a/b) worked out in the above-described measurement is defined as the aspect ratio of the carbonaceous material of the present invention.
(Secondary Admixture)

Secondary admixture refers to the incorporation in the negative electrode and/or negative electrode active material of at least two carbonaceous materials for which a property differs. The property referenced here indicates at least one characteristic selected from the group consisting of the x-ray diffraction parameters, median diameter, aspect ratio, BET specific surface area, orientation ratio, Raman R value, tap density, true density, pore distribution, circularity, and ash content.

Particularly preferred examples of this secondary admixture are the absence of left/right symmetry when the volume-based particle size distribution is centered on the median diameter, the incorporation of at least two carbonaceous materials having different Raman R values, and different x-ray parameters.

One example of the effects of a secondary admixture is a reduction in the electrical resistance through the incorporation as an electroconductive material of a carbonaceous material such as graphite, e.g., natural graphite and artificial graphite, carbon black, e.g., acetylene black, or an amorphous carbon such as needle coke.

When the electroconductive material is mixed as secondary admixture, the material may be mixed singly as one type, or as two or more concurrent types in any combinations and ratios. In addition, the mixing ratio with respect to the carbonaceous material of the electroconductive material is generally 0.1 mass % or more and is preferably 0.5 mass % or more and more preferably 0.6 mass % or more and is generally 45 mass % or less and is preferably 40 mass % or less. When the mixing ratio is in the indicated range, the effect of lowering the electrical resistance can be secured and an increase in the initial irreversible capacity can be suppressed.

<2-4 Structure of Negative Electrode and Method of Fabricating Negative Electrode>

Any known method can be used to produce the electrode, so long as the effect of the present invention is not significantly impaired thereby. For instance, the binder, the solvent and, as the case may require, a thickener, a conductive material, a filler and the like, are added to the negative electrode active material, to yield a slurry that is then applied onto a collector and is dried, followed by pressing. The negative electrode can be formed thereby.

In a case where an alloy-based material is used, a method is resorted to wherein a thin film layer (negative electrode active material layer) that contains the above-described negative electrode active material is formed by vapor deposition, sputtering, plating or the like.

(Collector)

Any known collector can be used as the collector that holds the negative electrode active material. Examples of the metallic material of the collector of the negative electrode include, for instance, aluminum, copper, nickel, stainless steel, nickel-plated steel or the like, but preferably copper, in terms of cost and ease of processing.

In a case where the collector is a metallic material, the collector may be shaped, for instance, as a metal foil, metal cylinder, metal coil, metal plate, metal thin film, expanded metal, punched metal, foamed metal or the like. Preferably, the collector is a metal thin film, more preferably a copper foil, and yet more preferably a rolled copper foil obtained by rolling or an electrolytic copper foil obtained by electrolysis.

The thickness of the collector is generally 1 μm or more, preferably 5 μm or more, and generally 100 μm or less, preferably 50 μm or less.

(Ratio Between Thickness of Negative Electrode Active Material Layer and Thickness of Current Collector)

The ratio between the thickness of the negative electrode active material layer and the thickness of the current collector is not particularly limited, but the value of "(thickness of the negative electrode active material layer on one side immediately prior to immersion in the non-aqueous electrolyte solution)/(thickness of the current collector)" is preferably 150 or less, more preferably 20 or less, and particularly preferably 10 or less and is preferably 0.1 or more, more preferably 0.4 or more, and particularly preferably 1 or more. When the thickness ratio of the negative electrode active material layer to the current collector is in the indicated range, the battery capacity can be secured and heat generation by the current collector during high current density charge/discharge can also be restrained.

(Binder)

The binder that binds the negative electrode active material is not particularly limited, provided that it is a stable material towards the non-aqueous electrolyte solution and towards the solvent that is used during the production of the electrodes.

Specific examples thereof include, for instance, resin-based polymers such as polyethylene, polypropylene, polyethylene terephthalate, polymethyl methacrylate, aromatic polyamide, polyimide, cellulose, nitrocellulose or the like; rubber-like polymers such as SBR (styrene-butadiene rubber), isoprene rubber, butadiene rubber, fluororubber, NBR (acrylonitrile-butadiene rubber), ethylene-propylene rubber or the like; styrene-butadiene-styrene block copolymers or hydrogenated products thereof; thermoplastic elastomeric polymers such as EPDM (ethylene-propylene-diene terpolymer), styrene-ethylene-butadiene-styrene copolymers, styrene-isoprene-styrene block copolymers, or hydrogenated products thereof; hard resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride, polytetrafluoroethylene, fluorinated polyvinylidene fluoride, polytetrafluoroethylene-ethylene copolymers and the like; and polymer compositions having ionic conductivity towards alkali metal ions (in particular, lithium ions). The foregoing may be used singly as one type, or as two or more concurrent types in any combinations and ratios.

The percentage for the binder with reference to the negative electrode active material is preferably 0.1 mass % or more, more preferably 0.5 mass % or more, and particularly preferably 0.6 mass % or more and is preferably 20 mass % or less, more preferably 15 mass % or less, even more preferably 10 mass % or less, and particularly preferably 8 mass % or less. If the percentage of the binder in the negative electrode active material exceeds the abovementioned range, there increases the percentage of binder that makes no contribution to battery capacity, and battery capacity may drop. If the percentage is below the abovementioned range, the strength of the negative electrode may decrease.

When, in particular, a rubbery polymer, as typified by SBR, is incorporated for the major component, the percentage of the binder with reference to the negative electrode active material is generally 0.1 mass % or more and is preferably 0.5 mass % or more and more preferably 0.6 mass % or more and is generally 5 mass % or less and is preferably 3 mass % or less and more preferably 2 mass % or less. In a case where the main component is a fluoropolymer typified by polyvinylidene fluoride, the percentage in the negative electrode active material is generally 1 wt % or more, preferably 2 wt % or more, yet more preferably 3 wt % or more, and generally 15 wt % or less, preferably 10 wt % or less and yet more preferably 8 wt % or less.

(Solvent Used for Forming Slurry)

The solvent used for forming the slurry is not particularly limited, and may be any aqueous solvent or organic solvent, provided that the solvent can dissolve or disperse the negative electrode active material, the binder, as well as a thickener and conductive material that are used as the case may require.

Examples of aqueous solvents include, for instance, water and alcohol. Examples of organic solvents include, for instance, N-methylpyrrolidone (NMP), dimethyl formamide, dimethyl acetamide, methyl ethyl ketone, cyclohexanone, methyl acetate, methyl acrylate, diethyl triamine, N,N-dimethylaminopropyl amine, tetrahydrofuran (THF), toluene, acetone, diethyl ether, dimethyl acetamide, hexamethylphosphoric amide, dimethyl sulfoxide, benzene, xylene, quinoline, pyridine, methyl naphthalene, hexane and the like.

In the case where an aqueous solvent is used, it is preferable to add a dispersant or the like in conjunction with the thickener, and to form a slurry using a latex of SBR or the like. These solvents may be used singly as one type, or as two or more concurrent types in any combinations and ratios.

(Thickener)

A thickener is generally used in order to adjust the viscosity of the slurry. The thickener is not particularly limited, and specific examples thereof include, for instance, carboxymethyl cellulose, methyl cellulose, hydroxymethyl cellulose, ethyl cellulose, polyvinyl alcohol, starch oxide, phosphorylated starch, casein, as well as salts thereof. The foregoing may be used singly as one type, or as two or more concurrent types in any combinations and ratios.

When a thickener is used, the percentage for the thickener with reference to the negative electrode active material is generally 0.1 mass % or more and is preferably 0.5 mass % or more and more preferably 0.6 mass % or more and is generally 5 mass % or less and is preferably 3 mass % or less and more preferably 2 mass % or less. When the percentage for the thickener with reference to the negative electrode active material is in the indicated range, a reduction in the battery capacity and an increase in the resistance can be suppressed while an appropreate coating behavior can be secured at the same time.

(Electrode Density)

There are no particular limitations on the electrode structure when the negative electrode active material is converted into an electrode, and the density of the negative electrode active material present on the current collector is preferably 1 $g \cdot cm^{-3}$ or more, more preferably 1.2 $g \cdot cm^{-3}$ or more, and particularly preferably 1.3 $g \cdot cm^{-3}$ or more and is preferably 2.2 $g \cdot cm^{-3}$ or less, more preferably 2.1 $g \cdot cm^{-3}$ or less, even more preferably 2.0 $g \cdot cm^{-3}$ or less, and particularly preferably 1.9 $g \cdot cm^{-3}$ or less. If the density of the negative electrode active material that is present on the collector exceeds the abovementioned range, negative electrode active material particles may break, initial irreversible capacity may increase, and the high-current density charge-discharge characteristic may worsen on account of lower permeability of the non-aqueous electrolyte solution in the vicinity of the interface of the collector/negative electrode active material.

(Thickness of Negative Electrode Plate)

The thickness of the negative electrode plate is designed in accordance with the positive electrode plate that is used, and is not particularly limited. The thickness of the negative electrode active material layer, resulting from subtracting the thickness of the metal foil (collector) from that of the negative electrode plate, is generally 15 µm or more, preferably 20 µm or more, more preferably 30 µm or more, and generally 300 µm or less, preferably 280 µm or less, and more preferably 250 µm or less.

(Surface Cover of Negative Electrode Plate)

A surface cover may be used in which a substance having composition different from that of the surface of the negative electrode plate is deposited on the surface of the negative electrode plate. Examples of surface deposition substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; and carbonates such as lithium carbonate, calcium carbonate, magnesium carbonate and the like.

<2-5. Positive Electrode>

(Positive Electrode Active Material)

The positive electrode active material is not particularly limited, so long as it is capable of electrochemically absorbing and releasing lithium ions, but, for instance, is preferably a substance that contains lithium and at least one transition metal. Specific examples include, for instance, lithium-transition metal complex oxides, lithium-containing transition metal phosphate compounds and the like.

The transition metal in the lithium transition metal composite oxide is preferably V, Ti, Cr, Mn, Fe, Co, Ni, Cu, and so forth. Specific examples are lithium cobalt composite oxides such as $LiCoO_2$; lithium nickel composite oxides such as $LiNiO_2$; lithium manganese composite oxides such as $LiMnO_2$, $LiMn_2O_4$, and $Li_2MnO_4$; and lithium transition metal composite oxides provided by substituting a portion of the majority transition metal atoms in the preceding lithium transition metal composite oxides with other metal, e.g., Al, Ti, V, Cr, Mn, Fe, Co, Li, Ni, Cu, Zn, Mg, Ga, Zr, Si, and so forth.

Specific examples of the substituted lithium transition metal composite oxides are $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

The transition metal in the lithiated transition metal phosphate compound is preferably V, Ti, Cr, Mn, Fe, Co, Ni, Cu, and so forth, and the lithiated transition metal phosphate compound can be specifically exemplified by iron phosphates such as $LiFePO_4$, $Li_3Fe_2(PO_4)_3$, and $LiFeP_2O_7$; cobalt phosphates such as $LiCoPO_4$; and lithiated transition metal phosphate compounds provided by substituting a portion of the majority transition metal atoms in the preceding lithiated transition metal phosphate compounds with other metal, e.g., Al, Ti, V, Cr, Mn, Fe, Co, Li, Ni, Cu, Zn, Mg, Ga, Zr, Nb, Si and so forth.

(Surface Cover)

A surface cover may be used in which a substance having composition different from that of the surface of the positive electrode active material is deposited on the surface of the positive electrode active material. Examples of surface-deposited substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; carbonates such as lithium carbonate, calcium carbonate, magnesium carbonate or the like; and carbons.

The surface deposition substances may be deposited on the positive electrode active material surface in accordance with a method that involves, for instance, dissolving or suspending the surface deposition substance in a solvent, and causing the surface deposition substance to be impregnated into/added to the positive electrode active material, followed by drying, or a method that involves dissolving or suspending a surface deposition substance precursor in a solvent, and causing the precursor to be impregnated into/added to the positive electrode active material, followed by heating or the like to elicit a reaction; or a method that involves addition of a surface deposition substance precursor to a positive electrode active material precursor, with simultaneous firing of the foregoing. In a case where carbon is to be deposited, a method may be resorted to wherein a carbonaceous substance, for instance in the form of activated carbon or the like, is mechanically deposited at a later time.

The amount of the surface-bound substance used, expressed as the mass with reference to the positive electrode active material, is preferably 0.1 ppm or more, more preferably 1 ppm or more, and even more preferably 10 ppm or more as lower limits and is preferably 20% or less, more preferably 10% or less, and even more preferably 5% or less as upper limits. The oxidation reactions of the electrolyte solution at the surface of the positive electrode material can be inhibited by the surface-bound substance and the battery life can thereby be improved. When the range indicated above is obeyed, the resistance associated with an inhibition of lithium ion insertion/extraction can be suppressed, while the aforementioned effect can be satisfactorily manifested.

In the present invention, "positive electrode active material" denotes also a positive electrode active material such that a substance of a composition different from that of the positive electrode active material is deposited on the surface of the positive electrode active material.

(Shape)

The shape of the particles of the positive electrode active material may be, for instance, lumpy, polyhedral, spherical, oval-spherical, plate-like, needle-like or columnar, as in conventional instances. Preferred among the foregoing, however, is a spherical to oval-spherical shape in secondary particles that are formed through aggregation of primary particles. In electrochemical elements, ordinarily, the active materials in the electrodes expand and contract accompanying charge and discharge of the element. The resulting stress is likely to give rise to deterioration of the active material on account of breakage or conductive path depletion. Therefore, in order to relieve stress derived from expansion and contraction and avert thereby deterioration, an active material in which secondary particles are formed through aggregation of primary particles is preferable to a single-particle active material of primary particles alone. Herein, spherical to oval-spherical particles are preferable to particles having axial orientation, such as plate-like particles or the like, since in the former case orientation during electrode molding is low, and, accordingly, expansion and contraction of the electrodes during charge and discharge is likewise low, while, moreover, homogeneous mixing with the conductive material is likelier to be achieved during production of the electrode.

(Tap Density)

The tap density of the positive electrode active material is preferably 0.5 g/cm$^3$ or more, more preferably 1.0 g/cm$^3$ or more, even more preferably 1.5 g/cm$^3$ or more, and most preferably 1.7 g/cm$^3$ or more. When the tap density of the positive electrode active material is in the indicated range, the amount of dispersion medium required during formation of the positive electrode active material layer can be kept down and the required amount of the electroconductive material and/or binder can also be kept down and as a result the packing ratio of the positive electrode active material and the battery capacity can be ensured. The use of a composite oxide powder with a high tap density enables the formation of a high-density positive electrode active material layer. A larger tap density is thus generally more preferred, and, while there is no particular upper limit on this tap density, it is preferably 2.7 g/cm$^3$ or less, more preferably 2.5 g/cm$^3$ or less. The load characteristics can be kept from declining in this range.

The tap density is determined in the present invention as the powder packing density (tap density) in g/cc when 5 to 10 g of the positive electrode active material powder is introduced into a 10-mL glass graduated cylinder and 200 taps with a stroke of approximately 20 mm are administered.

(Median Diameter d50)

The median diameter d50 of the particles of the positive electrode active material (the secondary particle diameter when the primary particles undergo aggregation to form secondary particles) is preferably 0.3 µm or more, more preferably 1.2 µm or more, even more preferably 1.5 µm or more, and most preferably 2 µm or more and is preferably 20 µm or less, more preferably not 18 µm or less, even more preferably 16 µm or less, and most preferably 15 µm or less. In the indicated range, a high tap density product is obtained and a reduction in the battery properties can be suppressed, and, in addition, problems such as streaking and so forth can be prevented during fabrication of the battery positive electrode, i.e., when the active material and electroconductive material, binder, and so forth are slurried with a solvent and coated in thin film form. Fillability during production of the positive electrode can be further enhanced by mixing two or more types of positive electrode active materials having different median diameters d50.

In the present invention, the median diameter d50 is measured using a known laser diffraction/scattering particle size measurement instrument. When an LA-920 from Horiba, Ltd. is used as the particle distribution analyzer, a 0.1 mass % aqueous solution of sodium hexametaphosphate is used as the dispersion medium used in the measurement; ultrasound dispersion is performed for 5 minutes; and the measurement refractive index is set to 1.24 and the measurement is performed.

(Average Primary Particle Diameter)

In those instances in which the primary particles undergo aggregation to form secondary particles, the average primary particle diameter of the positive electrode active material is preferably 0.05 µm or more, more preferably 0.1 µm or more, and even more preferably 0.2 µm or more and is preferably 2 µm or less, more preferably 1.6 µm or less, even more preferably 1.3 µm or less, and most preferably 1 µm or less as upper limits. Within the indicated range, the powder packing behavior and specific surface area are secured and a decline in the battery performance can be suppressed, and, in addition, an appropriate crystallinity is obtained and due to this the charge/discharge reversibility can be ensured.

In the present invention, the primary particle size is measured through observation using a scanning electron microscope (SEM). Specifically, the largest value of a section by a left-right boundary of primary particles with respect to a straight line in the horizontal direction, is worked out, in micrographs at a 10000× magnification, for 50 arbitrary primary particles. The average of the values is taken then as the primary particle size.

(BET Specific Surface Area)

The BET specific surface area of the positive electrode active material is preferably 0.4 m$^2$/g or more, more preferably 0.5 m$^2$/g or more, and even more preferably 0.6 m$^2$/g or more and is preferably 50 m$^2$/g or more, more preferably 40

$m^2/g$ or more, and even more preferably 30 $m^2/g$ or more as upper limits. When the BET specific surface area is in the indicated range, the battery performance can be ensured, and, in addition, an excellent coating behavior by the positive electrode active material can be maintained.

The BET specific surface area is defined in the present invention as the value measured using a surface area analyzer (for example, a fully automatic surface area analyzer from Ohkura Riken Co., Ltd.) and using, after the sample has been subjected to a preliminary drying for 30 minutes at 150° C. under a nitrogen current, the BET nitrogen adsorption single-point method and the gas flow technique and using a nitrogen-helium mixed gas precisely adjusted to provide a value of 0.3 for the relative pressure of the nitrogen versus atmospheric pressure.

(Method of Producing Positive Electrode Active Material)

General methods are used to produce the inorganic compounds in the production of the positive electrode active material. Various methods may be contemplated in particular for producing a spherical to oval active material. An example here are methods in which the phosphorous starting material such as phosphoric acid and the starting material in M of composition formula (1) are dissolved or pulverized and dispersed in a solvent, e.g., water; the pH is adjusted while stirring and a spherical precursor is produced and recovered; this is dried as necessary; an Li source, e.g., LiOH, $Li_2Co_3$, $LiNO_3$, and so forth, is subsequently added; and the active material is then obtained by high-temperature calcination.

A positive electrode active material with compositional formula (1) and/or a positive electrode active material with compositional formula (1) that has been coated with the surface-bound substance may be used by itself for the fabrication of the positive electrode, or at least one different composition may be used co-used therewith in a freely selected combination and proportion. Preferred combinations in this case are combinations with $LiMn_2O_4$ or a composite oxide provided by replacing a portion of the Mn in $LiMn_2O_4$ with, for example, another transition metal, and combinations with $LiCoO_2$ or a composite oxide provided by replacing a portion of the Co in $LiCoO_2$ with, for example, another transition metal. Here, the positive electrode active material with compositional formula (1) and/or the positive electrode active material with compositional formula (1) that has been coated with the surface-bound substance is preferably 30 mass % or more of the overall positive electrode active material and is more preferably 50 mass % or more. The use of a small proportion of the positive electrode active material with compositional formula (1) and/or the positive electrode active material with compositional formula (1) that has been coated with the surface-bound substance may result in a low battery capacity. The "positive electrode active material with compositional formula (1) and/or the positive electrode active material with compositional formula (1) that has been coated with the surface-bound substance" and a "positive electrode active material other than the positive electrode active material with compositional formula (1) and/or the positive electrode active material with compositional formula (1) that has been coated with the surface-bound substance" are collectively referred to as a "positive electrode active material".

<2-6. Structure of Positive Electrode and Method of Fabricating Positive Electrode>

The structure of the positive electrode is described in the following. In the present invention, the positive electrode is produced by forming, onto a collector a positive electrode active material layer that contains the positive electrode active material and a binder. The positive electrode that uses a positive electrode active material can be produced in accordance with ordinary methods. Specifically, the positive electrode active material and the binder, and, as the case may require, a conductive material, a thickener and the like, are dry-mixed to yield a sheet-like mixture that is then pressure-bonded against a positive electrode collector; alternatively, these materials are dissolved or dispersed in a liquid medium, to yield a slurry that is then coated onto a positive electrode collector, followed by drying, to form a positive electrode active material layer on the collector. The positive electrode can be obtained thereby.

The content of positive electrode active material in the positive electrode active material layer is preferably 80 wt % or more, more preferably 82 wt % or more, and particularly preferably 84 wt % or more. The upper limit is preferably 95 wt % or less, and more preferably 93 wt % or less. In the indicated range, the electrical capacity of the positive electrode active material in the positive electrode active material layer can be ensured, and, in addition, the strength of the positive electrode can be maintained.

In order to increase the packing density of the positive electrode active material, the positive electrode active material layer that is obtained by coating and drying is preferably compacted using a hand press, a roller press or the like. The density of the positive electrode active material layer is in the range from preferably 1.5 $g/cm^3$ or more, more preferably 2 $g/cm^3$ or more, and even more preferably 2.2 $g/cm^3$ or more as lower limits to preferably 3.5 $g/cm^3$ or less, more preferably 3 $g/cm^3$ or less, and even more preferably 2.8 $g/cm^3$ or less as upper limits. Above that range, there is less penetration of the electrolyte solution up to the vicinity of the collector/active material interface; also, the charge-discharge characteristic becomes poorer, and high output may fail to be obtained, in particular at high current densities. Below the abovementioned range, conduction between active material particles drops, battery resistance increases, and high output may fail to be achieved.

(Conductive Material)

Any known materials can be used as the conductive material. Specific examples thereof include, for instance, metallic materials such as copper, nickel or the like; graphite such as natural graphite, artificial graphite or the like; carbon black such as acetylene black; and carbon materials such as amorphous carbon, for instance needle coke or the like. The foregoing may be used singly as one type, or as two or more concurrent types in any combinations and ratios. The content of conductive material that is used in the positive electrode active material layer is generally 0.01 wt % or more, preferably 0.1 wt % or more, more preferably 1 wt % or more as an upper limit, and is generally 50 wt % or less, preferably 30 wt % or less, more preferably 15 wt % or less. A satisfactory electrical conductivity and battery capacity can be ensured in the indicated range.

(Binder)

The binder used to produce of the positive electrode active material layer is not particularly limited, and may be any material that is dissolved or dispersed in the liquid medium that is used during electrode production, in the case of a coating method. Specific examples thereof include, for instance, resin-based polymers such as polyethylene, polypropylene, polyethylene terephthalate, polymethyl methacrylate, polyimide, aromatic polyamide, cellulose, nitrocellulose or the like; rubber-like polymers such as SBR (styrene-butadiene rubber), NBR (acrylonitrile-butadiene rubber), fluororubber, isoprene rubber, butadiene rubber, ethylene-propylene rubber or the like; thermoplastic elastomeric polymers such as styrene-butadiene-styrene block copolymers and hydrogenated products thereof, EPDM (ethylenepropylene-diene terpolymer), styrene-ethylene-butadiene-ethylene copolymers, styrene-isoprene-styrene block copolymers, or hydrogenated products thereof; hard resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride (PVdF), polytetrafluoroethylene, fluorinated polyvinylidene fluoride, polytetrafluoroethylene-ethylene copolymers and the like; and polymer compositions having ionic conductivity towards alkali metal ions (in particular, lithium ions). These substances may be used singly as one type, or as two or more concurrent types in any combinations and ratios.

The percentage of binder in the positive electrode active material layer is generally 0.1 wt % or more, preferably 1 wt % or more, and yet more preferably 3 wt % or more as an upper limit, and is generally 80 wt % or less, preferably 60 wt % or less, yet more preferably 40 wt % or less and most preferably 10 wt % or less. When this range is obeyed, the mechanical strength of the positive electrode can be secured and the battery properties, e.g., the cyclic characteristics and so forth, can be prevented from deteriorating, while the battery capacity and electroconductivity can be prevented from declining.

(Solvent Used for Forming Slurry)

The solvent used for forming the slurry is not particularly limited, and may be any aqueous solvent or organic solvent, provided that the solvent can dissolve or disperse the positive electrode active material, conductive material, the binder, as well as a thickener that are used as the case may require. The aqueous medium can be exemplified by water and water+alcohol mixed media. The organic medium can be exemplified by aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethyl ether, propylene oxide, and tetrahydrofuran (THF); amides such as N-methylpyrrolidone (NMP), dimethylformamide, and dimethylacetamide; and aprotic polar solvents such as hexamethylphosphoramide and dimethyl sulfoxide.

If an aqueous medium is used, in particular, a slurry is preferably formed using a thickener and a latex of styrene-butadiene rubber (SBR) or the like. A thickener is generally used in order to adjust the viscosity of the slurry. The thickener is not particularly limited, and specific examples thereof include, for instance, carboxymethyl cellulose, methyl cellulose, hydroxymethyl cellulose, ethyl cellulose, polyvinyl alcohol, starch oxide, phosphorylated starch, casein, as well as salts thereof. The foregoing may be used singly as one type, or as two or more concurrent types in any combinations and ratios. In those cases in which a thickener is also added, the percentage for the thickener with reference to the active material is in the range from 0.1 mass % or more and preferably 0.5 mass % or more and more preferably 0.6 mass % or more to 5 mass % or less and preferably 3 mass % or less and more preferably 2 mass % or less. In the indicated range, a reduction in the battery capacity and an increase in the resistance can be suppressed while an excellent coating behavior can be obtained at the same time.

(Collector)

The material of the positive electrode collector is not particularly limited, and any known material can be used. Specific examples thereof include, for instance, metallic materials such as aluminum, stainless steel, nickel plating, titanium, tantalum or the like; and carbon materials such as carbon cloth, carbon paper or the like. Aluminum is particularly preferred from among the above metallic materials.

In a case where the collector is a metallic material, the collector may be shaped, for instance, as a metal foil, metal cylinder, metal coil, metal plate, metal thin film, expanded metal, punched metal, foamed metal or the like. In the case of a carbon material, the collector may be shaped as a carbon plate, carbon thin film, carbon cylinder or the like. A metal thin film is preferred among the foregoing. The thin film may be appropriately formed as a mesh. The thickness of the thin film may be any thickness, but is generally 1 μm or more, preferably 3 μm or more, more preferably 5 μm or more as an upper limit, is generally 1 mm or less, preferably 100 μm or less and more preferably 50 μm or less.

Preferably, a conductive aid is coated onto the surface of the collector, in terms of lowering the electron contact resistance between the collector and the positive electrode active material layer. Examples of conductive aids include, for instance, carbon and noble metals such as gold, platinum, silver or the like.

The ratio between the thickness of the positive electrode active material layer and the thickness of the current collector is not particularly limited, but the value of (thickness of the positive electrode active material layer on one side immediately prior to immersion in the electrolyte solution)/(thickness of the current collector) is in the range from preferably 20 or less, more preferably 15 or less, and most preferably 10 or less to, as lower limits, preferably 0.5 or more, more preferably 0.8 or more, and most preferably 1 or more. When this range is obeyed, heat generation by the current collector during high current density charge/discharge can be suppressed and the battery capacity can be ensured.

(Electrode Area)

In a case where the non-aqueous electrolyte solution according to the invention is used, viewed from the perspective of increasing the stability during high outputs and high temperatures, the area of the positive electrode active material layer is preferably made large relative to the exterior area of the outer case of the battery. In specific terms, the sum total of the electrode area of the positive electrode is, as the area ratio, preferably 15 times or more and more preferably 40 times or more that of the surface area of the outside of the secondary battery. The outer surface area of the outer case refers, in the case of a closed-bottom prismatic configuration, to the total area determined by calculation from the length, width, and thickness dimensions of the case part in which the electricity-producing element is packed, excluding the projections for the terminals. In the case of a closed-bottom cylindrical configuration, it is the geometric surface area for the approximation as a cylinder of the case part in which the electricity-producing element is packed, excluding the projections for the terminals. The sum total of the electrode area of the positive electrode is the geometric surface area of the positive electrode mixture layer that faces the mixture layer containing the negative electrode active material, and, for a structure in which a positive electrode mixture layer is formed on both sides of an intervening current collector foil, it refers to the total of the areas separately calculated for each side.

(Thickness of Positive Electrode)

The thickness of the positive electrode plate is not particularly limited. In terms of high capacity and high output, however, the thickness of the positive electrode active material layer resulting from subtracting the thickness of the metal foil (collector) from that of the positive electrode plate, has a lower limit, with respect to one face of the collector, that is preferably 10 µm or more, more preferably 20 µm or more, and, as an upper limit, is preferably 500 µm or less and more preferably 450 µm or less.

(Surface Cover on Positive Electrode Plate)

A surface cover may be used in which a substance having composition different from that of the surface of the positive electrode plate is deposited on the surface of the positive electrode plate. Examples of surface-deposited substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; carbonates such as lithium carbonate, calcium carbonate, magnesium carbonate or the like; and carbons.

<2-7. Separator>

Ordinarily, a separator is interposed between the positive electrode and the negative electrode, in order to prevent short-circuits. Ordinarily, the non-aqueous electrolyte solution of the present invention is used by being impregnated into such a separator.

The material and shape of the separator are not particularly limited, and any known materials and shapes may be used, so long as the effect of the present invention is not significantly impaired thereby. Among the foregoing there are preferably used, for instance, a resin, glass fibers, inorganic materials or the like that are formed out of a stable material towards the non-aqueous electrolyte solution of the present invention, in the form of a porous sheet or nonwoven fabric-like member having excellent liquid retention.

Examples of materials of resin and glass-fiber separators include, for instance, polyolefins such as polyethylene or polypropylene, aromatic polyamide, polytetrafluoroethylene, polyether sulfone, glass filters and the like. Preferred among the foregoing are glass filters and polyolefins, and yet more preferably polyolefins. These materials may be used singly as one type, or as two or more concurrent types in any combinations and ratios.

The separator may be of any thickness, but the thickness is generally 1 µm or more, preferably 5 µm or more, more preferably 8 µm or more, and generally 50 µm or less, preferably 40 µm or less and more preferably 30 µm or less. The insulation properties and mechanical strength of the separator may be impaired if the thickness thereof is excessively smaller than the abovementioned range. In the indicated range, the insulating character and mechanical strength can be ensured and the energy density and battery performance, e.g., the rate characteristics and so forth, can also be ensured.

When using a porous separator such as a porous sheet or a nonwoven fabric, the separator may have any porosity, but the porosity is generally 20% or more, preferably 35% or more, and yet more preferably 45% or more, and generally 90% or less, preferably 85% or less and yet more preferably 75% or less. When the void ratio is in the indicated range, the insulating character and mechanical strength can be ensured and the film resistance can be restrained and excellent rate characteristics can be obtained.

The average pore diameter of the separator may also be freely selected, but is generally 0.5 µm or less and is preferably 0.2 µm or less and is generally 0.05 µm or more. When the average pore diameter is in the indicated range, short circuiting is prevented while the film resistance can be restrained and excellent rate characteristics can be obtained.

The inorganic material that is used is, for instance, an oxide such as alumina or silicon dioxide, a nitride such as aluminum nitride or silicon nitride, or a sulfate such as barium sulfate or calcium sulfate, in the form of particles or fibers.

The separator may be used in the form of a thin film of a nonwoven fabric, a woven fabric, a micro-porous film or the like. As regards thin-film shape, a thin film having a pore diameter ranging from 0.01 to 1 µm and thickness ranging from 5 to 50 µm is appropriately used. Other than the above independent thin-film shape, a separator can also be used that is obtained by forming, on the surface layer of the positive electrode and/or the negative electrode, a composite porous layer containing particles of the above-described inorganic material, using a resin binder. For instance, a porous layer can be formed, on both sides of a positive electrode, out of alumina particles such that 90%-particle size is smaller than 1 µm, using a fluororesin as a binder.

<2-8. Battery Design>

(Electrode Group)

The electrode group may be a stacked structure in which the above-described separator is interposed between the above-described positive electrode plate and negative electrode plate, or a structure wherein the above-described positive electrode plate and negative electrode plate are wound spirally, with the above-described separator interposed in between. The percentage of the volume of the electrode group in the internal volume of the battery (hereafter, referred to as electrode group occupancy rate) is generally 40% or more, preferably 50% or more, and generally 90% or less, preferably 80% or less.

When the electrode group proportion is in the indicated range, the battery capacity can be ensured, and, in addition, the decline in properties, e.g., the repetitive charge/discharge performance and high-temperature storability, associated with a rise in the internal pressure can be suppressed and the operation of the gas discharge valve can also be prevented.

(Collection Structure)

The collection structure is not particularly limited, but elaboration as a structure that reduces the resistance of the interconnect elements and joint elements is preferred in order to achieve a more effective manifestation of the improvement in the high current density charge/discharge characteristics that is brought about by the non-aqueous electrolyte solution of the present invention. The effects from the use of the non-aqueous electrolyte solution of the present invention are manifested particularly well when the internal resistance is reduced in this manner.

For an electrode group with the layer structure described above, a structure is favorably used in which the metal core elements of the individual electrode layers are bundled and welded to a terminal. In those instances in which a single sheet has a large electrode area, a large internal resistance occurs. Hence, preferably a method is used in which the resistance is reduced by providing a plurality of terminals within an electrode. For an electrode group with the wound structure described above, the internal resistance can be lowered by providing a plurality of lead structures to the positive electrode and negative electrode, respectively, and collecting these at terminals.

(Outer Case)

The material of the outer case is not particularly limited, so long as it is a substance that is stable in the non-aqueous electrolyte solution that is used. Specific examples of the material that can be used include, for instance, metals such as nickel-plated steel plate, stainless steel, aluminum or aluminum alloys, magnesium alloys or the like; or a multilayer film (laminate film) of resin and aluminum foil. A metal such as aluminum or aluminum alloy, or a laminate film, are appropriately used from the viewpoint of achieving lighter weights.

Examples of outer cases that utilize metals include, for instance, outer cases having an airtight sealed structure resulting from welding metals together by laser welding, resistance welding, ultrasonic welding or the like. In an alternative structure, the metals may be crimped to each other with a resin-made gasket interposed in between. Examples of an outer case that utilizes the abovementioned laminate film include, for instance, outer cases having an airtight sealed structure through thermal pressure-bonding of resin layers to each other. In order to enhance sealability, a resin that is different from that of the resins used in the laminate film may be interposed between the abovementioned resin layers. In the particular case of a sealed structure resulting from thermal pressure-bonding of resin layers with interposed collecting terminals, metal and resin are joined to each other, and hence a resin having polar groups or a resin that is modified through introduction of polar groups is appropriately used as the interposed resin.

(Protective Element)

As the protective element there can be used, for instance, a PTC (positive temperature coefficient) in which resistance increases upon abnormal heat generation or upon excessive current flow, a temperature fuse, a thermistor, or a valve (current shutoff valve) that shuts off current that flows in a circuit when the internal pressure and/or internal temperature in the battery rise suddenly upon abnormal heat generation. As the protective element there is preferably selected a protective element that is in an inoperative condition during ordinary use with high current. More preferably, the battery is designed so that abnormal heat generation or thermal runaway does not occur even in the absence of the protective element.

(Outer Package)

The non-aqueous electrolyte secondary battery of the present invention is ordinarily configured by housing the above-described non-aqueous electrolyte solution, negative electrode, positive electrode, separator and so forth inside an outer package. The outer package is not particularly limited, and any known outer package can be used, so long as the effect of the present invention is not significantly impaired thereby. Specifically, the outer package may be of any material, but ordinarily there is used, for instance, nickel-plated iron, stainless steel, aluminum or alloys thereof, nickel, titanium or the like.

The shape of the outer package may be any shape. For instance the outer package may be of cylindrical type, box-like type, laminate type, coin type, large type and the like.

EXAMPLES

Example 1

<Production of Non-Aqueous Electrolyte Secondary Battery>
(Fabrication of Positive Electrode)

90 mass parts of lithium nickel manganese cobaltate ($LiNi_{1/3}Mn_{1/3}Co_{1/3}O_2$) was used as the positive electrode active material and was mixed with 7 mass parts of a carbon black and 3 mass parts of a polyvinylidene fluoride; N-methyl-2-pyrrolidone was added; and a slurry was prepared. This was uniformly coated and dried on both sides of a 15 μm-thick aluminum foil, and the positive electrode was subsequently obtained by pressing to provide a density for the positive electrode active material layer of 2.6 $gcm^{-3}$.

(Production of Negative Electrode)

A water-based dispersion of sodium carboxymethyl cellulose (1 mass % concentration of the sodium carboxymethyl cellulose) as a thickener and a water-based dispersion of a styrene-butadiene rubber (50 mass % concentration of the styrene-butadiene rubber) as a binder were added to a graphite that had a Raman R value—defined as the ratio of the peak intensity at 1360 $cm^{-1}$ to the peak intensity at 1580 $cm^{-1}$ in argon ion laser Raman spectroscopy—of 0.33, and a slurry was prepared by mixing with a disperser. The obtained slurry was uniformly coated and dried on one side of a 12 μm-thick copper foil, and a negative electrode was then obtained by pressing so as to bring the density of the negative electrode active material layer to 1.4 $g·cm^{-3}$. The fabrication was carried out to provide a graphite:sodium carboxymethyl cellulose:styrene-butadiene rubber mass ratio=98:1:1 in the negative electrode after drying.

(Fabrication of Non-Aqueous Electrolyte Secondary Battery)

The previously described positive electrode and negative electrode and a polyethylene separator (25 μm) were stacked in the sequence negative electrode, separator, positive electrode, separator, negative electrode. The thusly obtained battery element was packaged in a cylindrical aluminum laminate film; the electrolyte solution described below was introduced; and vacuum sealing was then performed to fabricate a sheet-form non-aqueous electrolyte secondary battery. In addition, in order to raise the intimacy of contact between the electrodes, the sheet-form battery was sandwiched between glass plates and pressure was applied.

<Evaluation of Non-Aqueous Electrolyte Secondary Batteries>

(Conditioning)

In a 25° C. thermostat, the sheet-form non-aqueous electrolyte secondary battery was subjected to constant current-constant voltage charging to 4.1 V at 0.2 C followed by discharge to 3.0 V at 0.2 C. The battery was stabilized by performing five cycles of this. 1 C is the current value that discharges the total capacity of the battery in 1 hour.

(Evaluation of Cycle Characteristic)

500 cycles were run at 60° C. where 1 cycle was the process of charging at a constant current corresponding to 2 C followed by discharge at a constant current of 2 C.

The discharge capacities at the 500th cycle of batteries that used the non-aqueous electrolyte solution of the present invention were compared using a value of 1 for the discharge capacity at the 500th cycle of a battery that used a non-aqueous electrolyte solution (the reference electrolyte solution) that did not contain the isocyanate compound according to the present invention. Thus, values determined from the formula (discharge capacity at the 500th cycle for the non-aqueous electrolyte solution of the present invention)/(discharge capacity at the 500th cycle for the reference electrolyte solution) are compared. The results are given in Table 1.

(Evaluation of Low-Temperature Discharge Characteristic)

Using the battery charged with the amount of electricity that corresponded to 50% of the initial capacity, discharge was performed in a −30° C. atmosphere for 10 seconds each at 0.3 C, 0.5 C, 1.0 C, 1.5 C, 2.0 C, and 2.5 C and the voltage at the tenth second was measured. The current value when 3 V was reached was calculated from the thusly obtained current-voltage curve, and this value was used as the low-temperature discharge characteristic. The current values of the batteries that used the non-aqueous electrolyte solution of the present invention were compared using 1 for the current value when the reference electrolyte solution was used. Thus, values determined from the formula (current value for the non-aqueous electrolyte solution of the present invention)/(current value for the reference electrolyte solution) are compared. The results are given in Table 1.

Example 1-1

Sufficiently dried LiPF$_6$ was dissolved in a mixture of ethylene carbonate, dimethyl carbonate and ethylmethyl carbonate (volume ratio 3:3:4) in a dry argon atmosphere so as to be 1 mol/L in the overall non-aqueous electrolyte solution (this electrolyte solution is also abbreviated as the "reference electrolyte solution"). The non-aqueous electrolyte solution was prepared by adding 0.5 mass % of DURANATE™ TPA-100 (Asahi Kasei Chemicals Corporation), which has an isocyanurate skeleton, to the reference electrolyte solution.

Example 1-2

An electrolyte solution was prepared as in Example 1-1, but using DURANATE™ 24A-100 (Asahi Kasei Chemicals Corporation), which has a biuret skeleton, in place of the DURANATE™ TPA-100.

Example 1-3

An electrolyte solution was prepared as in Example 1-1, but using DURANATE™ D101 (Asahi Kasei Chemicals Corporation), which has a urethane skeleton, in place of the DURANATE™ TPA-100.

Example 1-4

An electrolyte solution was prepared as in Example 1-3, but using 1.0 mass % for the content of the DURANATE™ D101 in the overall non-aqueous electrolyte solution.

Example 1-5

An electrolyte solution was prepared as in Example 1-1, but using 1.0 mass % with reference to the overall non-aqueous electrolyte solution for the content of the DURANATE™ TPA-100.

Example 1-6

An electrolyte solution was prepared as in Example 1-1, but using 2.5 mass % with reference to the overall non-aqueous electrolyte solution for the content of the DURANATE™ TPA-100.

Comparative Example 1-1

An electrolyte solution was prepared as in Example 1-1, but using the reference electrolyte solution, which did not contain the isocyanate compound according to the present invention, and battery fabrication, cycle testing, and low-temperature discharge testing were carried out using the same methods as in Example 1. The thusly obtained results are given in Table 1.

Comparative Example 1-2

An electrolyte solution was prepared as in Example 1-1, but using 1,6-diisocyanatohexane (HDI) in place of the DURANATE™ TPA-100.

Comparative Example 1-3

An electrolyte solution was prepared as in Comparative Example 1-2, but using 1.0 mass % with reference to the overall non-aqueous electrolyte solution for the content of the HDI.

Comparative Example 1-4

An electrolyte solution was prepared as in Example 1-1, but using 3.0 mass % with reference to the overall non-aqueous electrolyte solution for the content of the DURANATE™ TPA-100.

TABLE 1

| | Isocyanate compound according to the present invention | | Cycle characteristic | low-temperature discharge characteristic |
|---|---|---|---|---|
| | Type | mass % | | |
| Example 1-1 | TPA-100 | 0.5 | 1.04 | 0.78 |
| Example 1-2 | 24A-100 | 0.5 | 1.04 | 0.79 |
| Example 1-3 | D101 | 0.5 | 1.03 | 0.88 |
| Example 1-4 | D101 | 1.0 | 1.05 | 0.73 |
| Example 1-5 | TPA-100 | 1.0 | 1.07 | 0.47 |
| Example 1-6 | TPA-100 | 2.5 | 1.13 | 0.27 |
| Comparative Example 1-1 | None | 0 | 1.00 | 1.00 |
| Comparative Example 1-2 | HDI | 0.5 | 1.04 | 0.61 |
| Comparative Example 1-3 | HDI | 1.0 | 1.09 | 0.06 |
| Comparative Example 1-4 | TPA-100 | 3.0 | 0.95 | 0.18 |

The results in Table 1 demonstrate that, as their content increases, the isocyanate compounds according to the present invention and the 1,6-diisocyanatohexane (HDI) used in the comparative examples do improve the cycle characteristic, but also present a declining trend with regard to the low-temperature discharge characteristic. However, the isocyanate compounds according to the present invention were observed to have a clearly smaller decline than the substantial decline in the low-temperature discharge characteristic that occurred when the amount of addition of the comparative example compound was increased. Thus, the use of the isocyanate compound according to the present invention makes possible a battery design in which both properties, i.e., the cycle characteristic and the low-temperature discharge characteristic, are blended in good balance.

Example 2

Evaluations were carried out in this example using a battery structure and reference electrolyte solution, which are described below, that were different from those in Example 1.
<Production of Non-Aqueous Electrolyte Secondary Battery>
(Fabrication of Positive Electrode)

72 mass parts of a lithium manganate ($Li_{1.1}Mn_{1.9}Al_{0.1}O_4$) as a first positive electrode active material, 18 mass parts of a lithium nickel manganese cobalt composite oxide ($Li_{1.15}Ni_{0.45}Mn_{0.45}Co_{0.10}O_2$) as a second positive electrode active material, 5 mass parts of a carbon black as an electroconductive agent, and 5 mass parts of a polyvinylidene fluoride (PVdF) as a binder were mixed and slurried in N-methyl-2-pyrrolidone; this was uniformly coated and dried on a 15 μm-thick aluminum foil; and the positive electrode was then obtained by roll pressing.

(Fabrication of Negative Electrode)

6 mass parts of a polyvinylidene fluoride (PVdF) as a binder and 1 mass part of a carbon black were mixed and slurried in N-methyl-2-pyrrolidone with 93 mass parts of a graphite powder; this was uniformly coated and dried on a 12 µm-thick copper foil; and the negative electrode was then obtained by roll pressing.

(Fabrication of Non-Aqueous Electrolyte Secondary Battery)

The previously described positive electrode and negative electrode and a polyolefin separator (25 µm) were stacked in the sequence negative electrode, separator, positive electrode. The thusly obtained battery element was packaged in an aluminum laminate film; the electrolyte solution described below was introduced; and vacuum sealing was then performed to fabricate a sheet-form non-aqueous electrolyte secondary battery.

<Evaluation of Non-Aqueous Electrolyte Secondary Battery>

(Initial Charge/Discharge)

In a 25° C. thermostat, the sheet-form non-aqueous electrolyte secondary battery was subjected to constant current-constant voltage charging to 4.2 V at 0.1 C (1 C is the current value that discharges the rated capacity, as the 1 hour rate discharge capacity, in 1 hour. This also applies in the following.) followed by discharge to 3.0 V at 0.1 C. Constant current-constant voltage charging was then performed to 4.2 V at 0.3 C followed by discharge to 3.0 V at 0.3 C. The non-aqueous electrolyte secondary battery was stabilized by performing 2 cycles of this for a total of 3 cycles. Ageing was thereafter carried out by holding the battery for 24 hours at 60° C. Charge/discharge was then performed at 0.3 C, during which the discharge capacity was measured and was taken to be the initial capacity.

(Evaluation of Cycle Characteristic)

30 cycles were run at 55° C. where 1 cycle was the process of constant current-constant voltage charging to 4.2 V at a constant current corresponding to 1 C followed by discharge to 3.0 V at a constant current of 1 C. The cycle retention rate was calculated using the following formula. The results are given in Table 2.

(discharge capacity at the 30th cycle)/(discharge capacity at the first cycle)

Example 2-1

While operating under a dry argon atmosphere, thoroughly dried $LiPF_6$ was dissolved, at 1 mol/L in the overall non-aqueous electrolyte solution, in a mixture of ethylene carbonate and diethyl carbonate (3:7 volume ratio) (This electrolyte solution is abbreviated as the "second reference electrolyte solution"). A non-aqueous electrolyte solution was prepared by adding DURANATE™ TPA-100 and fluoroethylene carbonate (FEC), at 0.5 mass % and 2.0 mass %, respectively, to the second reference electrolyte solution.

Example 2-2

A non-aqueous electrolyte solution was prepared as in Example 2-1 by adding DURANATE™ TPA-100 and vinylene carbonate (VC), at 0.5 mass % and 1.0 mass %, respectively, to the second reference electrolyte solution.

Example 2-3

A non-aqueous electrolyte solution was prepared as in Example 2-1 by adding DURANATE™ TPA-100, FEC, and vinylene carbonate (VC), at 0.5 mass %, 1.0 mass %, and 1.0 mass %, respectively, to the second reference electrolyte solution.

Example 2-4

A non-aqueous electrolyte solution was prepared as in Example 2-1 by adding DURANATE™ TPA-100, FEC, and succinic anhydride (SUC), at 0.5 mass %, 1.0 mass %, and 0.2 mass %, respectively, to the second reference electrolyte solution.

Example 2-5

A non-aqueous electrolyte solution was prepared as in Example 2-1 by adding DURANATE™ TPA-100, VC, and SUC, at 0.5 mass %, 1.0 mass %, and 0.2 mass %, respectively, to the second reference electrolyte solution.

Comparative Example 2-1

With the exception that the isocyanate compound according to the present invention and the other auxiliary agents were omitted, electrolyte solution preparation, battery fabrication, and cycle testing were carried out as in Example 2-1.

Comparative Example 2-2

With the exception that the DURANATE™ TPA-100 was omitted, electrolyte solution preparation, battery fabrication, and cycle testing were carried out as in Example 2-3. The thusly obtained results are given in Table 2.

TABLE 2

| | Isocyanate compound according to the present invention Type (content · mass %) | Auxiliary agent Type (content · mass %) | Cycle characteristic (retention rate, %) |
|---|---|---|---|
| Example 2-1 | TPA-100 (0.5) | FEC (2) | 97.8 |
| Example 2-2 | TPA-100 (0.5) | VC (1) | 97.6 |
| Example 2-3 | TPA-100 (0.5) | FEC (1.0) + VC (1.0) | 97.8 |
| Example 2-4 | TPA-100 (0.5) | FEC (1.0) + SUC (0.2) | 98 |
| Example 2-5 | TPA-100 (0.5) | VC (1.0) + SUC (0.2) | 98.1 |
| Comparative Example 2-1 | None | None | 95.1 |
| Comparative Example 2-2 | None | FEC (1.0) + VC (1.0) | 96.9 |

It can be seen from the results in Table 2 that, even for a different battery structure and for different types and compositions of the non-aqueous solvent and auxiliary agents making up the electrolyte, the use of the structure of the present invention can improve the cycle characteristic just as in Example 1 given above.

Example 3

Evaluations were carried out in this example using a battery structure and reference electrolyte solution, described below, that were different from those in Example 1 and Example 2.

<Production of Non-Aqueous Electrolyte Secondary Battery>

(Fabrication of Positive Electrode)

A slurry was formed by mixing, in an N-methylpyrrolidone solvent, 94 wt % of $LiCoO_2$ as a positive electrode active material, 3 wt % of acetylene black as a conductive material, and 3 wt % of polyvinylidene fluoride (PVdF) as a binder. This was uniformly coated and dried on both sides of a 21 μm-thick aluminum foil followed by pressing to provide a positive electrode.

(Fabrication of Negative Electrode)

A slurry was formed by adding 1 parts by weight of an aqueous dispersion of sodium carboxymethyl cellulose (concentration of sodium carboxymethyl cellulose 1 wt %), and 1 part by weight of an aqueous dispersion of styrene-butadiene rubber (styrene-butadiene rubber concentration 50 wt %), as a thickener and a binder, respectively, to 100 parts by weight of graphite powder as the negative electrode active material, with mixing in a disperser. This slurry was uniformly coated and dried on one side of a 12 μm-thick copper foil followed by pressing to provide a negative electrode.

(Fabrication of Non-Aqueous Electrolyte Secondary Battery)

The above-described positive electrode, negative electrode, and a polyethylene separator (25 μm) were sequentially stacked, in the order of negative electrode, separator and positive electrode, to produce a battery element. The battery element was inserted into a bag comprising a laminate film in which aluminum (thickness 40 μm) was covered, on both sides, by a resin layer, while causing the terminals of the positive electrode and the negative electrode to be disposed protrusively. Thereafter, each electrolyte solution described below was poured into a bag, which was then vacuum-sealed, to prepare a sheet-like battery.

<Evaluation of Non-Aqueous Electrolyte Secondary Batter>

(Evaluation of Initial Capacity)

At 25° C., the non-aqueous electrolyte battery in a state of being pressed between glass plates was stabilized by constant-current charging to 4.1 V at a current corresponding to 0.2 C followed by discharging to 3 V at a constant current of 0.2 C and additionally by constant current-constant voltage charging (referred to below as "CCCV charging" as appropriate) to 4.33 V at a current corresponding to 0.2 C (0.05 C cut off) followed by discharging to 3 V at 0.2 C. It was then subjected to CCCV charging (0.05 C cut off) to 4.33 V at 0.2 C and was subsequently again discharged to 3 V at 0.2 C to determine the initial discharge capacity. Here, 1 C represents the current value that discharges the reference capacity of the battery in 1 hour, and, for example, 0.2 C represents one-fifth of this current value. Herein, 1 C represents the current value for discharge of the reference capacity of the battery over 1 hour, and 0.2 C represents a current value that is ⅕ of 1 C.

(High-Temperature Storage Characteristics Test)

Again after CCCV charge (0.05 C cut off) to 4.33 V, high-temperature storage was implemented at 85° C. for 24 hours. After sufficient cooling of the battery, the volume of the latter was measured through immersion in an ethanol bath, to work out the amount of gas generated, on the basis of changes in volume before and after storage. Next, the battery was discharged down to 3 V, at 0.2 C, at a temperature of 25° C., and the residual capacity after the high-temperature storage characteristic test was measured. The percentage of the residual capacity with respect to the initial discharge capacity was worked out and was taken as the residual capacity (%) after high-temperature storage. CCCV charging (0.05 cut off) to 4.33 V was again carried out; discharge to 3 V at 0.2 C was performed and the 0.2 C discharge capacity after the high-temperature storage characteristics test was measured; and the percentage of the 0.2 C discharge capacity with reference to the initial discharge capacity was determined and this was taken to be the recovered capacity (%) after high-temperature storage. The evaluation results are given in Table 3. The value in the table is a relative value with respect to 100% for Comparative example 3-1.

Example 3-1

While operating under a dry argon atmosphere, thoroughly dried $LiPF_6$ was dissolved, at 1 mol/L in the overall non-aqueous electrolyte solution, in a mixture of ethylene carbonate, monofluoroethylene carbonate, and dimethyl carbonate (15:15:70 volume ratio) (This electrolyte solution is abbreviated as the "third reference electrolyte solution"). A non-aqueous electrolyte solution was prepared by adding DURANATE™ TPA-100, VC, and adiponitrile (AdpCN), at 0.3 mass %, 1.0 mass %, and 1.0 mass %, respectively, to the third reference electrolyte solution.

Example 3-2

An electrolyte solution was prepared as in Example 3-1, but using 0.5 mass % for the content of the DURANATE™ TPA-100.

Comparative Example 3-1

With the exception that the DURANATE™ TPA-100 was omitted, electrolyte solution preparation, battery fabrication, and evaluation of the high-temperature storage characteristics were carried out as in Example 3-1. The thusly obtained results are given in Table 3.

TABLE 3

| | Isocyanate compound according to the present invention Type (content · mass %) | Auxiliary agent Type (content · mass %) | Initial capacity (%) | High-temperature storage characteristics | | |
| --- | --- | --- | --- | --- | --- | --- |
| | | | | Amount of gas generation (%) | Residual capacity (%) | Recovered capacity (%) |
| Example 3-1 | TPA-100 (0.3) | VC (1.0) + AdpCN (1.0) | 100 | 67.3 | 101.6 | 101.2 |
| Example 3-2 | TPA-100 (0.5) | VC (1.0) + AdpCN (1.0) | 100 | 60 | 101.6 | 101.2 |
| Comparative Example 3-1 | None | VC (1.0) + AdpCN (1.0) | 100 | 100 | 100 | 100 |

It can be seen from the results in Table 3 that the use of the structure of the present invention can also suppress battery swelling and capacity deterioration when high-temperature storage is carried out, in addition to improving the cycle characteristics as in Example 1 and Example 2 given above.

Example 4

In this example, the cycle characteristic was evaluated as in Example 1 using the same battery structure and reference electrolyte solution as in Example 1, but using different auxiliary agents.

Example 4-1

A non-aqueous electrolyte solution was prepared by adding DURANATE™ D101 and lithium difluorophosphate ($LiPO_2F_2$), at 0.5 mass % and 0.5 mass %, respectively, to the reference electrolyte solution used in Example 1.

Example 4-2

An electrolyte solution was prepared as in Example 4-1, but using 0.3 mass % for the content of the DURANATE™ D101 in the overall non-aqueous electrolyte solution.

Example 4-3

An electrolyte solution was prepared as in Example 4-1, but using 1.0 mass % for the content of the DURANATE™ D101 in the overall non-aqueous electrolyte solution.

Example 4-4

An electrolyte solution was prepared as in Example 4-1, but using DURANATE™ TPA-100 in place of the DURANATE™ D101.

Example 4-5

An electrolyte solution was prepared as in Example 4-4, but using lithium bis(fluorosulfonyl)imide (LiFSI) in place of the $LiPO_2F_2$.

Example 4-6

An electrolyte solution was prepared as in Example 4-4, but using lithium trifluoromethanesulfonate (LiTFSI) in place of the $LiPO_2F_2$.

Example 4-7

An electrolyte solution was prepared as in Example 4-4, but using lithium fluorosulfonate ($LiSO_3F$) in place of the $LiPO_2F_2$.

Example 4-8

An electrolyte solution was prepared as in Example 4-4, but using lithium bis(oxalato)borate (LiBOB) in place of the $LiPO_2F_2$.

Example 4-9

An electrolyte solution was prepared as in Example 4-4, but using tris(trimethylsilyl) borate (TMSB) in place of the $LiPO_2F_2$.

Comparative Example 4-1

An electrolyte solution was prepared as in Example 4-4, but without adding the DURANATE™ TPA-100 to the electrolyte solution.

Comparative Example 4-2

An electrolyte solution was prepared as in Example 4-5, but without adding the DURANATE™ TPA-100 to the electrolyte solution.

Comparative Example 4-3

An electrolyte solution was prepared as in Example 4-6, but without adding the DURANATE™ TPA-100 to the electrolyte solution.

Comparative Example 4-4

An electrolyte solution was prepared as in Example 4-7, but without adding the DURANATE™ TPA-100 to the electrolyte solution.

Comparative Example 4-5

An electrolyte solution was prepared as in Example 4-8, but without adding the DURANATE™ TPA-100 to the electrolyte solution.

Comparative Example 4-6

An electrolyte solution was prepared as in Example 4-9, but without adding the DURANATE™ TPA-100 to the electrolyte solution.

TABLE 4

| | Isocyanate compound according to the present invention | | Auxiliary agent | | Discharge capacity |
|---|---|---|---|---|---|
| | Type | mass % | Type | mass % | at the 500th |
| Example 4-1 | D101 | 0.5 | $LiPO_2F_2$ | 0.5 | 1.05 |
| Example 4-2 | D101 | 0.3 | $LiPO_2F_2$ | 0.5 | 1.06 |
| Example 4-3 | D101 | 1.0 | $LiPO_2F_2$ | 0.5 | 1.07 |
| Example 4-4 | TPA-100 | 0.5 | $LiPO_2F_2$ | 0.5 | 1.08 |
| Example 4-5 | TPA-100 | 0.5 | LiFSI | 0.5 | 1.08 |
| Example 4-6 | TPA-100 | 0.5 | LiTFSI | 0.5 | 1.10 |
| Example 4-7 | TPA-100 | 0.5 | $LiSO_3F$ | 0.5 | 1.07 |
| Example 4-8 | TPA-100 | 0.5 | LiBOB | 0.5 | 1.13 |
| Example 4-9 | TPA-100 | 0.5 | TMSB | 0.5 | 1.08 |
| Comparative Example 1-1 | None | 0 | None | 0 | 1.00 |
| Comparative Example 4-1 | None | 0 | $LiPO_2F_2$ | 0.5 | 1.00 |
| Comparative Example 4-2 | None | 0 | LiFSI | 0.5 | 1.02 |
| Comparative Example 4-3 | None | 0 | LiTFSI | 0.5 | 0.97 |
| Comparative Example 4-4 | None | 0 | $LiSO_3F$ | 0.5 | 1.01 |
| Comparative Example 4-5 | None | 0 | LiBOB | 0.5 | 1.02 |
| Comparative Example 4-6 | None | 0 | TMSB | 0.5 | 0.96 |

According to the results in Table 4, Examples 4-1 to 4-9, which use both the isocyanate compound according to the present invention and a prescribed auxiliary agent as shown in Table 4, demonstrated an excellent cycle characteristic due to a unique synergistic effect that arises from the combination of these compounds.

Example 5

The following evaluations were carried out in this example using the same battery structure as in Example 1, but changing the charge/discharge conditions and using auxiliary agent combinations and a reference electrolyte solution that were different from Examples 1 to 4.
<Evaluation of Non-Aqueous Electrolyte Secondary Battery>
(Conditioning)

In a 25° C. thermostat, the sheet-form non-aqueous electrolyte secondary battery was subjected to constant current-constant voltage charging to 4.2 V at 0.2 C followed by discharge to 2.7 V at 0.2 C. The battery was stabilized by performing five cycles of this. 1 C is the current value that discharges the total capacity of the battery in 1 hour.
(Evaluation of Cycle Characteristic)

300 cycle were run at 45° C. were 1 cycle was the process of charging at a constant current corresponding to 1 C followed by discharge at a constant current of 1 C.

The discharge capacities at the 300th cycle of batteries that used the non-aqueous electrolyte solution of the present invention were compared using a value of 1 for the discharge capacity at the 300th cycle of a battery that used a non-aqueous electrolyte solution (the reference electrolyte solution) that did not contain the isocyanate compound according to the present invention or an auxiliary agent. Thus, values determined from the formula (discharge capacity at the 300th cycle for the non-aqueous electrolyte solution of the present invention)/(discharge capacity at the 300th cycle for the reference electrolyte solution) are compared. The results are given in Table 5.

Example 5-1

While operating under a dry argon atmosphere, thoroughly dried $LiPF_6$ was dissolved, at 1.2 mol/L in the overall non-aqueous electrolyte solution, in a mixture of ethylene carbonate, dimethyl carbonate, and ethyl methyl carbonate (3:3:4 volume ratio) (This electrolyte solution is abbreviated as the "fifth reference electrolyte solution"). A non-aqueous electrolyte solution was prepared by adding DURANATE™ TPA-100, VC, and LiBOB, at 0.5 mass %, 0.5 mass %, and 0.5 mass %, respectively, to the fifth reference electrolyte solution.

Example 5-2

A non-aqueous electrolyte solution was prepared as in Example 5-1 by adding DURANATE™ TPA-100, FEC, and LiBOB at, respectively, 0.5 mass %, 0.5 mass %, and 0.5 mass %, to the fifth reference electrolyte solution.

Example 5-3

A non-aqueous electrolyte solution was prepared as in Example 5-1 by adding DURANATE™ TPA-100, FEC, and $LiBF_4$ at, respectively, 0.5 mass %, 0.5 mass %, and 0.3 mass %, to the fifth reference electrolyte solution.

Comparative Example 5-1

With the exception that the fifth reference electrolyte solution lacking the isocyanate compound according to the present invention and other auxiliary agents was used, electrolyte solution preparation, battery fabrication, and cycle testing were performed as in Example 5-1.

Comparative Example 5-2

Electrolyte solution preparation, battery fabrication, and cycle testing were performed as in Example 5-2, with the exception that the DURANATE™ TPA-100 and LiBOB were not incorporated.

Comparative Example 5-3

Electrolyte solution preparation, battery fabrication, and cycle testing were performed as in Example 5-1, with the exception that the DURANATE™ TPA-100 was not incorporated.

Comparative Example 5-4

Electrolyte solution preparation, battery fabrication, and cycle testing were performed as in Example 5-2, with the exception that the DURANATE™ TPA-100 was not incorporated.

Comparative Example 5-5

Electrolyte solution preparation, battery fabrication, and cycle testing were performed as in Example 5-3, with the exception that the DURANATE™ TPA-100 was not incorporated.

TABLE 5

| | Isocyanate compound according to the present invention Type (content · mass %) | Auxiliary agent Type (content · mass %) | Discharge capacity at the 300th cycle |
|---|---|---|---|
| Example 5-1 | TPA-100 (0.5) | VC (0.5) + LiBOB (0.5) | 1.16 |
| Example 5-2 | TPA-100 (0.5) | FEC (0.5) + LiBOB (0.5) | 1.13 |
| Example 5-3 | TPA-100 (0.5) | FEC (0.5) + $LiBF_4$ (0.3) | 1.13 |
| Comparative Example 5-1 | None | None | 1.00 |
| Comparative Example 5-2 | None | FEC (0.5) | 1.02 |
| Comparative Example 5-3 | None | VC (0.5) + LiBOB (0.5) | 1.08 |
| Comparative Example 5-4 | None | FEC (0.5) + LiBOB (0.5) | 1.08 |
| Comparative Example 5-5 | None | FEC (0.5) + $LiBF_4$ (0.3) | 0.99 |

The results in Table 5 confirmed that the cycle characteristic was improved using the structure of the present invention even when the composition of the non-aqueous solvent and electrolyte constituting the non-aqueous electrolyte solution was changed. In addition, it was also confirmed that the cycle characteristic was improved still further by the additional incorporation of at least one selection from the group consisting of unsaturated cyclic carbonates and fluorinated cyclic carbonates.

Industrial Applicability

The non-aqueous electrolyte solution of the present invention makes possible the fabrication of non-aqueous electrolyte secondary batteries that exhibit excellent cycle characteristics and excellent low-temperature discharge characteristics, and the non-aqueous electrolyte solution of the present invention can therefore be favorably used in any field where non-aqueous electrolyte secondary batteries are used, e.g., for electronic devices and instruments.

The use of non-aqueous electrolyte solution and the non-aqueous electrolyte secondary battery of the present invention are not particularly limited, and these can be used in various known applications. Specific examples thereof include, for instance, notebook computers, pen-input PCs, mobile PCs, e-book players, mobile phones, portable fax machines, portable copiers, mobile printers, stereo headphones, video movies, LCD TVs, handy cleaners, portable CDs, Mini Discs, walkie-talkies, electronic organizers, calculators, memory cards, portable tape recorders, radios, back-up power supplies, motors, automobiles, motorcycles, mopeds, bicycles, lighting fixtures, toys, gaming devices, clocks, electric tools, strobes, and cameras.

The invention has been described in detail and with reference to specific embodiments thereof, it will be apparent to one skilled in the art that various changes and modifications can be made therein without departing from the spirit and scope thereof.

The invention claimed is:

1. A non-aqueous electrolyte solution for a non-aqueous electrolyte secondary battery that has a positive electrode and a negative electrode capable of the absorbing and releasing of a metal ion, and a separator,
the non-aqueous electrolyte solution comprising:
an electrolyte,
a non-aqueous solvent, and
0.01 mass % to less than 3 mass % of a compound comprising a partial structure of formula (1) and at least two isocyanate groups:

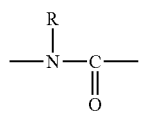

(1)

wherein
R is hydrogen or a $C_1$-$C_{12}$ organic group comprising an atom selected from the group consisting of hydrogen atom, carbon atom, nitrogen atom, oxygen atom, sulfur atom, phosphorus atom, and halogen atom, and
wherein the $C_1$-$C_{12}$ organic group optionally comprises an isocyanate group.

2. The non-aqueous electrolyte solution according to claim 1, wherein the compound comprising a partial structure of formula (1) is a compound comprising at least one skeleton selected from the group consisting of uretdione, oxadiazinetrione, biuret, urethane, allophanate, and isocyanurate.

3. The non-aqueous electrolyte solution according to claim 1, wherein a number-average molecular weight of the compound comprising a partial structure of formula (1) is from 300 to 5000.

4. The non-aqueous electrolyte solution according to claim 1, further comprising 0.5 to 3 mol/L lithium hexafluorophosphate ($LiPF_6$).

5. The non-aqueous electrolyte solution according to claim 1, further comprising a compound selected from the group consisting of monofluorophosphate salts, difluorophosphate salts, tetrafluoroborate salts, and compounds of formulas (2) to (5):

wherein l and m are each independently integers from 0 to 4;

wherein n is an integer from 0 to 4;

wherein $M^1$ is an element selected from Groups 1 and 2 of the Periodic Table, and aluminum (Al); $M^2$ is an element selected from the transition metals and Groups 13, 14, and 15 of the Periodic Table; R is a group selected from halogens, $C_1$-$C_{11}$ alkyl groups, and $C_1$-$C_{11}$ halogen-substituted alkyl; a and b are positive integers; c is 0 or a positive integer; and d is an integer from 1 to 3;

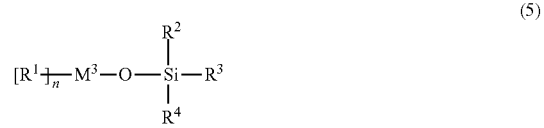

wherein $M^3$ is a metal atom, a phosphorus atom, a boron atom, or P=O. $R^1$ is a $C_1$-$C_{11}$ alkyloxy group, a silyloxy group, or a $C_1$-$C_{11}$ alkylsilyloxy group. n is the number of $R^1$ groups bonded to the $M^3$ with the proviso that when n is two or more, the $R^1$ groups may be the same or may differ from one another, $R^2$ to $R^4$ are each independently a $C_1$-$C_{11}$ alkyl group, a $C_1$-$C_{11}$ alkenyl group, a $C_1$-$C_{11}$ alkyloxy, or a $C_6$-$C_{11}$ aryl group).

6. The non-aqueous electrolyte solution according to claim 5, comprising a compound of formula (4) in which $M^1$ is lithium and $M^2$ is phosphorus or boron.

7. The non-aqueous electrolyte solution according to claim 5, comprising a compound of formula (5) in which $M^3$ is boron or P=O.

8. The non-aqueous electrolyte solution according to claim 5, wherein a content of the compound selected from the group consisting of monofluorophosphate salts, difluorophosphate salts, tetrafluoroborate salts, and compounds represented by the general formulas (2) to (5) is from 0.01 to 5 mass % of the non-aqueous electrolyte solution.

9. The non-aqueous electrolyte solution according to claim 5, wherein the compound selected is at least one selected from the group consisting of lithium monofluorophosphate, lithium difluorophosphate, lithium tetrafluoroborate, lithium bis(fluorosulfonyl)imide, lithium bis(trifluoromethanesulfonyl)imide, lithium fluorosulfonate, lithium trifluoromethanesulfonate, lithium bis(oxalato)borate, lithium difluoro(oxalato)borate, lithium tris(oxalato)phosphate, lithium difluorobis(oxalato)phosphate, lithium tetrafluoro(oxalato)phosphate, tris(trimethylsilyl) borate, and tris(trimethylsilyl) phosphate.

10. The non-aqueous electrolyte solution according to claim 1, further comprising a compound selected from the group consisting of unsaturated cyclic carbonates, fluorinated cyclic carbonates, and dinitrile compounds of formula (6):

wherein A is a $C_1$-$C_{10}$ organic group comprising an atom selected from the group consisting of hydrogen atom, carbon atom, nitrogen atom, oxygen atom, sulfur atom, phosphorus atom, and halogen atom.

11. The non-aqueous electrolyte solution according to claim 1, for a non-aqueous electrolyte secondary battery, wherein the secondary battery comprises a separator comprising at least one of polyethylene and polypropylene.

12. The non-aqueous electrolyte solution according to claim 1, for a non-aqueous electrolyte secondary battery, wherein the secondary battery comprises carbon as a negative electrode active material.

13. A non-aqueous electrolyte secondary battery comprising: a positive electrode and a negative electrode which are capable of the absorbing and releasing of a metal ion; a separator; and the non-aqueous electrolyte solution according to claim 1.

14. The non-aqueous electrolyte secondary battery according to claim 13, which comprises carbon as a negative electrode active material, wherein a Raman R value of the carbon is 0.1 or more;

wherein, the Raman R value is defined as a ratio, in argon laser Raman spectroscopy, of the peak intensity at 1360 $cm^{-1}$ to the peak intensity at 1580 $cm^{-1}$.

* * * * *